US011790884B1

(12) United States Patent
Shakeri et al.

(10) Patent No.: US 11,790,884 B1
(45) Date of Patent: Oct. 17, 2023

(54) GENERATING SPEECH IN THE VOICE OF A PLAYER OF A VIDEO GAME

(71) Applicant: Electronic Arts Inc., Redwood City, CA (US)

(72) Inventors: Zahra Shakeri, Mountain View, CA (US); Jervis Pinto, Toronto (CA); Kilol Gupta, Redwood City, CA (US); Mohsen Sardari, Burlingame, CA (US); Harold Chaput, Castro Valley, CA (US); Navid Aghdaie, San Jose, CA (US); Kenneth Moss, Menlo Park, CA (US)

(73) Assignee: ELECTRONIC ARTS INC., Redwood City, CA (US)

( * ) Notice: Subject to any disclaimer, the term of this patent is extended or adjusted under 35 U.S.C. 154(b) by 297 days.

(21) Appl. No.: 17/082,266

(22) Filed: Oct. 28, 2020

(51) Int. Cl.
  *G10L 13/047* (2013.01)
  *G10L 13/033* (2013.01)
  *A63F 13/54* (2014.01)
  *G10L 21/007* (2013.01)
  *A63F 13/215* (2014.01)

(52) U.S. Cl.
  CPC .......... *G10L 13/047* (2013.01); *A63F 13/215* (2014.09); *A63F 13/54* (2014.09); *G10L 13/033* (2013.01); *G10L 21/007* (2013.01)

(58) Field of Classification Search
  CPC ... G10L 13/047; G10L 13/033; G10L 21/007; A63F 13/215; A63F 13/54
  See application file for complete search history.

(56) References Cited

U.S. PATENT DOCUMENTS

| | | | |
|---|---|---|---|
| 2019/0122651 A1* | 4/2019 | Arik | G10L 13/027 |
| 2020/0372897 A1* | 11/2020 | Battenberg | G06N 3/084 |
| 2020/0394998 A1* | 12/2020 | Kim | G06N 3/08 |
| 2021/0097976 A1* | 4/2021 | Chicote | G10L 13/047 |
| 2021/0225358 A1* | 7/2021 | Monge Alvarez | G10L 13/027 |
| 2022/0051654 A1* | 2/2022 | Finkelstein | G06N 3/0454 |
| 2022/0246136 A1* | 8/2022 | Yang | G06N 3/0445 |
| 2022/0277728 A1* | 9/2022 | Zhang | G10L 25/30 |

(Continued)

OTHER PUBLICATIONS

Liao, Qianli, et al. "Bridging the gaps between residual learning, recurrent neural networks and visual cortex." arXiv preprint arXiv:1604.03640 (2016) (Year: 2016).*

(Continued)

*Primary Examiner* — Andrew C Flanders
*Assistant Examiner* — Michael C. Lee
(74) *Attorney, Agent, or Firm* — Gray Ice Higdon

(57) ABSTRACT

A computer-implemented method of generating speech audio in a video game is provided. The method includes inputting, into a synthesizer module, input data that represents speech content. Source acoustic features for the speech content in the voice of a source speaker are generated and are input, along with a speaker embedding associated with a player of the video game into an acoustic feature encoder of a voice convertor. One or more acoustic feature encodings are generated as output of the acoustic feature encoder, which are inputted into an acoustic feature decoder of the voice convertor to generate target acoustic features. The target acoustic features are processed with one or more modules, to generate speech audio in the voice of the player.

18 Claims, 10 Drawing Sheets

(56) References Cited

U.S. PATENT DOCUMENTS

2022/0358703 A1* 11/2022 Chae .................. G10L 15/16
2023/0009613 A1* 1/2023 Rosenberg ............ G06N 3/047

OTHER PUBLICATIONS

Shen, Jonathan, et al. "Natural tts synthesis by conditioning wavenet on mel spectrogram predictions." 2018 IEEE international conference on acoustics, speech and signal processing (ICASSP). IEEE, 2018 (Year: 2018).*

"Voice Skins—Real time voices conversion", available at https://web.archive.org/web/20190330104245/https://www.voicemod.net/voice-skins/, as of Mar. 30, 2019 (Year: 2019).*

Arik, Sercan O., et al. "Neural Voice Cloning with a Few Samples." arXiv preprint arXiv:1802.06006 (2018), Retrieved from https://arxiv.org/abs/1802.06006v3.

Jia, Ye, et al. "Transfer Learning from Speaker Verification to Multispeaker Text-To-Speech Synthesis." arXiv preprint arXiv:1806.04558 (2018), Retrieved from https://arxiv.org/abs/1806.04558.

Polyak, Adam, et al. "TTS skins: Speaker conversion via ASR." arXiv preprint arXiv:1904.08983 (2019), Retrieved from https://arxiv.org/abs/1904.08983.

Sun, Lifa, et al. "Voice conversion using deep bidirectional long short-term memory based recurrent neural networks." 2015 IEEE international conference on acoustics, speech and signal processing (ICASSP). IEEE, 2015., Retrieved from: https://www.researchgate.net/profile/Lifa_Sun/publication/280919021_Voice_Conversion_Using_Deep_Bidirectional_Long_Short-Term_Memory_based_Recurrent_Neural_Networks/links/55cb072808aeca747d69fd26.pdf.

Kameoka, Hirokazu, et al. "StarGAN-VC: Non-parallel many-to-many voice conversion with star generative adversarial networks." arXiv preprint arXiv:1806.02169 (2018), Retrieved from https://arxiv.org/abs/1806.02169.

Liu, Li-Juan, et al. "WaveNet Vocoder with Limited Training Data for Voice Conversion." Interspeech. 2018, Retrieved from https://www.isca-speech.org/archive/Interspeech_2018/pdfs/1190.pdf.

Narayanan, Praveen, et al. "Hierarchical sequence to sequence voice conversion with limited data." arXiv preprint arXiv:1907.07769 (2019), Retrieved from https://arxiv.org/abs/1907.07769.

Zhang, Mingyang, et al. "Joint training framework for text-to-speech and voice conversion using multi-source tacotron and wavenet." arXiv preprint arXiv:1903.12389 (2019), Retrieved from https://arxiv.org/abs/1903.12389.

Huang, Wen-Chin, et al. "Voice transformer network: Sequence-to-sequence voice conversion using transformer with text-to-speech pretraining." arXiv preprint arXiv:1912.06813 (2019), Retrieved from https://arxiv.org/abs/1912.06813.

Luong, Hieu-Thi, and Junichi Yamagishi. "Bootstrapping non-parallel voice conversion from speaker-adaptive text-to-speech." arXiv preprint arXiv:1909.06532 (2019), Retrieved from https://arxiv.org/abs/1909.06532.

Kim, Tae-Ho, et al. "Emotional Voice Conversion using multitask learning with Text-to-speech." arXiv preprint arXiv:1911.06149 (2019), Retrieved from: https://arxiv.org/abs/1911.06149.

Ren, Yi, et al. "FastSpeech 2: Fast and High-Quality End-to-End Text-to-Speech." arXiv preprint arXiv:2006.04558 (2020), Retrieved from: https://arxiv.org/abs/2006.04558.

Skerry-Ryan, R. J., et al. "Towards end-to-end prosody transfer for expressive speech synthesis with tacotron." arXiv preprint arXiv:1803.09047 (2018), Retrieved from: https://arxiv.org/abs/1803.09047.

Theune, Mariët, et al. "Generating expressive speech for storytelling applications." IEEE Transactions on Audio, Speech, and Language Processing 14.4 (2006): 1137-1144., Retrieved from: https://ieeexplore.ieee.org/abstract/document/1643643.

Gibiansky, Andrew, et al. "Deep voice 2: Multi-speaker neural text-to-speech." Advances in neural information processing systems. 2017, Retrieved from: http://papers.nips.cc/paper/6889-deep-voice-2-multi-speaker-neural-text-to-speech.

Shen, Jonathan, et al. "Natural tts synthesis by conditioning wavenet on mel spectrogram predictions." 2018 IEEE International Conference on Acoustics, Speech and Signal Processing (ICASSP). IEEE, 2018, Retrieved from: https://ieeexplore.ieee.org/abstract/document/8461368.

Wu, Xixin, et al. "Rapid Style Adaptation Using Residual Error Embedding for Expressive Speech Synthesis." Interspeech. 2018, Retrieved from: http://www1.se.cuhk.edu.hk/~hccl/publications/pub/2018_201809_INTERSPEECH_XixinWU.pdf.

Kalchbrenner, Nal, et al. "Efficient Neural Audio Synthesis." International Conference on Machine Learning. 2018, Retrieved from: http://proceedings.mlr.press/v80/kalchbrenner18a.html.

Eyben, Florian, et al. "Unsupervised clustering of emotion and voice styles for expressive TTS." 2012 IEEE International Conference on Acoustics, Speech and Signal Processing (ICASSP). IEEE, 2012, Retrieved from: https://ieeexplore.ieee.org/abstract/document/6288797.

Wang, Yuxuan, et al. "Tacotron: Towards end-to-end speech synthesis." arXiv preprint arXiv:1703.10135 (2017), Retrieved from: https://arxiv.org/abs/1703.10135.

Wang, Yuxuan, et al. "Style Tokens: Unsupervised Style Modeling, Control and Transfer in End-to-End Speech Synthesis." ICML. 2018, Retrieved from: https://openreview.net/forum?id=Hy4s9o-OZr.

Akuzawa, Kei, Yusuke Iwasawa, and Yutaka Matsuo. "Expressive Speech Synthesis via Modeling Expressions with Variational Autoencoder." Proc. Interspeech 2018 (2018): 3067-3071, Retrieved from: https://www.isca-speech.org/archive/Interspeech_2018/abstracts/1113.html.

Taigman, Yaniv, et al. "VoiceLoop: Voice Fitting and Synthesis via a Phonological Loop." International Conference on Learning Representations. 2018, Retrieved from: https://openreview.net/forum?id=SkFAWax0-&noteId=SkFAWax0-.

Hsu, Wei-Ning, et al. "Hierarchical Generative Modeling for Controllable Speech Synthesis." International Conference on Learning Representations. 2018, Retrieved from: https://openreview.net/forum?id=rygkk305YQ.

Kenter, Tom, et al. "CHiVE: Varying prosody in speech synthesis with a linguistically driven dynamic hierarchical conditional variational network." International Conference on Machine Learning. 2019, Retrieved from: http://proceedings.mlr.press/v97/kenter19a.html.

Lee, Younggun, and Taesu Kim. "Robust and fine-grained prosody control of end-to-end speech synthesis." ICASSP 2019-2019 IEEE International Conference on Acoustics, Speech and Signal Processing (ICASSP). IEEE, 2019, Retrieved from: https://ieeexplore.ieee.org/abstract/document/8683501.

Klimkov, Viacheslav, et al. "Fine-Grained Robust Prosody Transfer for Single-Speaker Neural Text-To-Speech." Proc. Interspeech 2019 (2019): 4440-4444, Retrieved from: https://www.isca-speech.org/archive/Interspeech_2019/abstracts/2571.html.

Daniel, Povey, et al. "The Kaldi speech recognition toolkit." IEEE 2011 workshop on automatic speech recognition and understanding. No. EPFL-CONF-192584. 2011, Retrieved from: https://www.fit.vut.cz/research/product/304/.

Ghahremani, Pegah, et al. "A pitch extraction algorithm tuned for automatic speech recognition." 2014 IEEE International conference on acoustics, speech and signal processing (ICASSP). IEEE, 2014, Retrieved from: https://ieeexplore.ieee.org/abstract/document/6854049.

Zen et al., "The HMM-based Speech Synthesis System (HTS) Version 2.0" 6th ISCA Workshop on Speech Synthesis, Bonn, Germany, 6 pages, dated Aug. 24, 2007.

* cited by examiner

GENERATING SPEECH IN THE VOICE OF A PLAYER OF A VIDEO GAME

BACKGROUND

Many modern video games provide players with the ability to create their own personalized characters, or avatars. In some video games, players may be able to configure their avatars to speak in different voices. However, previous approaches of generating speech audio in a particular voice typically require many speech samples (e.g. hours of speech samples) in order for the synthesizer to accurately capture the voice in the synthesized speech audio.

Summary

In accordance with a first aspect, this specification describes a computer-implemented method of generating speech audio in a video game using a voice convertor that has been trained to convert acoustic features for a source speaker into acoustic features for a player of the video game. The method comprises inputting, into a synthesizer module, input data. The input data represents speech content. Source acoustic features for the speech content in the voice of a source speaker are generated as output of the synthesizer module. A target speaker embedding associated with a player of the video game and the source acoustic features are inputted into an acoustic feature encoder of the voice convertor. The target speaker embedding is a learned representation of the voice of the player. One or more acoustic feature encodings are generated as output of the acoustic feature encoder. The one or more acoustic feature encodings are inputted into an acoustic feature decoder of the voice convertor. Target acoustic features are generated, comprising decoding the one or more acoustic feature encodings using the acoustic feature decoder. The target acoustic features comprise acoustic features for the speech content in the voice of the player. The target acoustic features are processed with one or more modules, the one or more modules comprising a vocoder configured to generate speech audio in the voice of the player.

In accordance with a second aspect, this specification describes a computer-implemented method of generating speech audio data in a video game using a voice convertor that has been trained to convert acoustic features for a source speaker into acoustic features for a player of the video game. The method comprises: inputting, into an acoustic feature encoder of the voice convertor, (i) a target speaker embedding associated with a player of the video game, and (ii) source acoustic features for speech content in the voice of a source speaker. The target speaker embedding is a learned representation of the voice of the player. One or more acoustic feature encodings are generated as output of the acoustic feature encoder. The one or more acoustic feature encodings are inputted, into an acoustic feature decoder of the voice convertor. Target acoustic features are generated for generating speech audio data, comprising decoding the one or more acoustic feature encodings using the acoustic feature decoder. The target acoustic features comprise acoustic features for the speech content in the voice of the player.

In accordance with a third aspect, this specification describes a system for generating speech audio in a video game using a voice convertor that has been trained to convert acoustic features for a source speaker into acoustic features for a player of the video game. The system comprises a synthesizer. The synthesizer is configured to: receive input data representing speech content; and output source acoustic features for the speech content in the voice of a source speaker. The system further comprises a voice convertor. The voice convertor comprises an acoustic feature encoder and an acoustic feature decoder. The voice convertor is configured to: input, into the acoustic feature encoder, (i) a target speaker embedding associated with a player of the video game, wherein the target speaker embedding is a learned representation of the voice of the player, and (ii) the source acoustic features; generate, as output of the acoustic feature encoder, one or more acoustic feature encodings; input, into the acoustic feature decoder, the one or more acoustic feature encodings; and output target acoustic features for generating speech, comprising decoding the one or more acoustic feature encodings using the acoustic feature decoder. The target acoustic features comprise acoustic features for the speech content in the voice of the player. The system further comprises one or more modules configured to process the target acoustic features, the one or more modules comprising a vocoder configured to generate speech audio in the voice of the player.

BRIEF DESCRIPTION OF THE DRAWINGS

Certain embodiments of the present invention will now be described, by way of example, with reference to the following figures.

DETAILED DESCRIPTION

General Definitions

Figure 1:
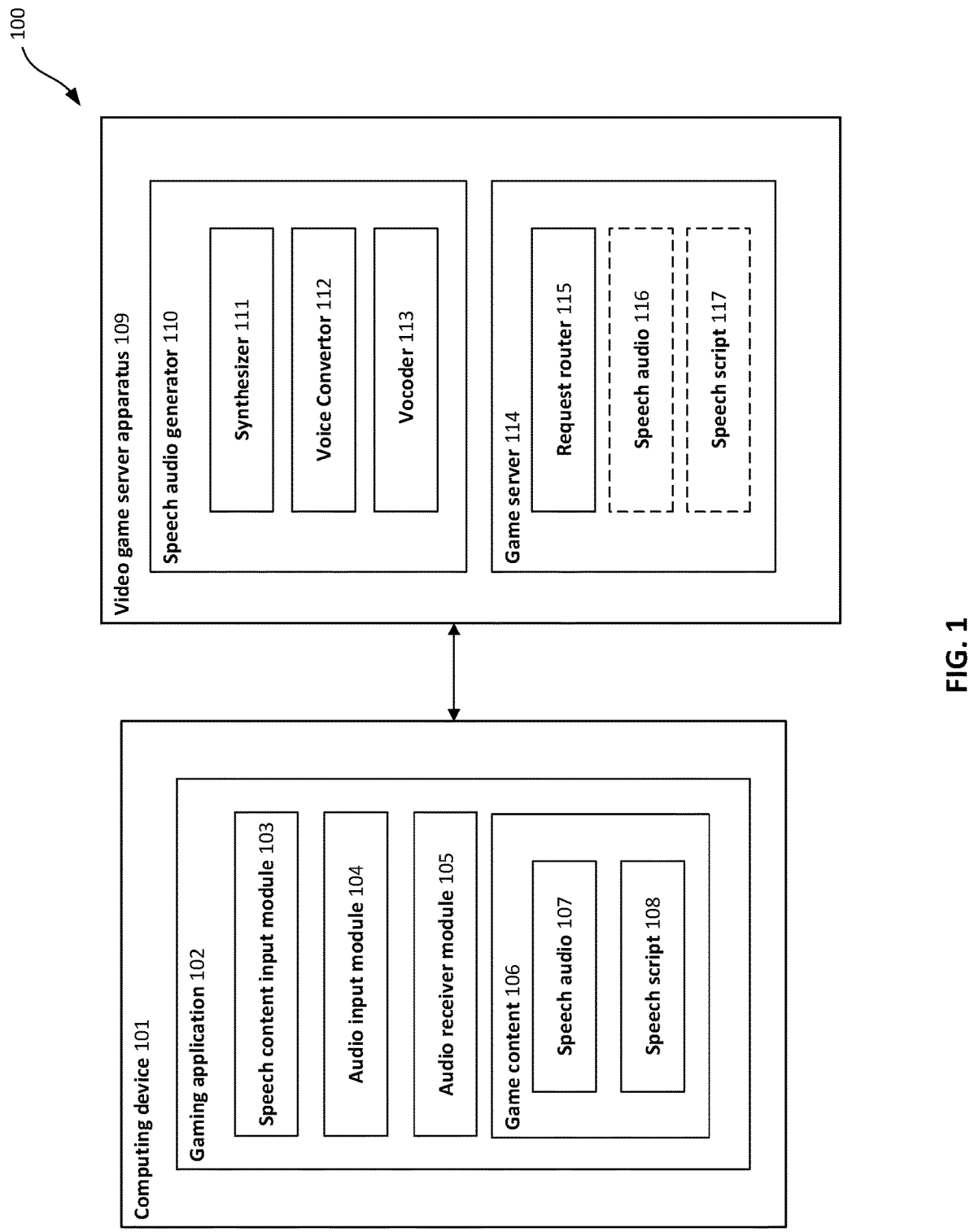
FIG. 1 is a schematic block diagram illustrating an example of a computer system configured to provide a video game environment to players of a video game.

The following terms are defined to aid the present disclosure and not limit the scope thereof.

A "user" or "player", as used in some embodiments herein, refers to an individual and/or the computing system(s) or device(s) corresponding to (e.g., associated with, operated by) that individual.

A "client" as used in some embodiments described herein, is a software application with which a user interacts, and which can be executed on a computing system or device locally, remotely, or over a cloud service.

A "server" as used in some embodiments described here, is a software application configured to provide certain services to a client, e.g. content and/or functionality.

A "video game" as used in some embodiments described herein, is a virtual interactive environment in which players engage. Video game environments may be facilitated through a client-server framework in which a client may connect with the server to access at least some of the content and functionality of the video game.

"Speech" as used in some embodiments described herein may include sounds in the form of spoken words in any language, whether real or invented and/or other utterances including paralinguistics such as sighs, yawns, moans etc. "Speech audio" refers to audio (e.g. audio data) which includes or represents speech, and may comprise data in any suitable audio file format whether in a compressed or uncompressed format.

"Text" as used in some in embodiments described herein refers to any suitable representation of characters, words or symbols that may be used to represent language and/or speech. In some cases, text may be input by use of a keyboard and/or stored in memory in the form of text data. Text may comprise text data in any suitable compressed or uncompressed format, e.g. ASCII format.

A "speech audio generator" as used in some embodiments described herein, is a software module that receives an indication of an utterance and outputs speech audio corresponding to the indication. Various characteristics of the output speech audio may be varied by speech audio generator modules described herein, e.g. speech content, speaker identity, and speech style (for example the prosody of the output speech).

"Acoustic features" as used in some embodiments described herein may include any suitable acoustic representation of frequency, magnitude and/or phase information. For example, acoustic features may comprise linear spectrograms, log-mel-spectrograms, linear predictive coding (LPC) coefficients, Mel-Frequency Cepstral Coefficients (MFCC), log fundamental frequency (LFO), band aperiodicity (bap) or combinations thereof.

Example implementations provide systems and methods for generating speech audio in a video game, using a voice convertor to generate acoustic features for a player of the video game. Specifically, the voice convertor is configured to convert acoustic features relating to a source speaker into acoustic features for the player.

Some previous approaches to generating speech audio in a particular voice make use of a text-to-speech system which includes a synthesizer. The synthesizer receives text and outputs acoustic features used to synthesize speech audio corresponding to the text. However, such approaches usually require many speech samples (e.g. hours of speech samples) in order for the synthesizer to accurately capture the voice in the synthesized speech audio. In addition, existing approaches may require retraining of the synthesizer (or the entirety of the text-to-speech system) when training to generate speech audio in a different voice. Furthermore, existing text-to-speech systems may not capture the variety in performance (e.g. speaking style, such as prosody) of real speech audio.

In contrast, systems and methods as described in this specification enable speech audio to be generated in the voice of a player of a video game, using speech audio provided by the player (e.g. a small amount of speech audio such as minutes of speech audio from the player), and a voice convertor.

Example systems described in this specification include a synthesizer and a vocoder in addition to the voice convertor. The synthesizer receives input data representing speech content, and optionally, speech style features, and outputs acoustic features for the speech content, taking into account the (optional) speech style features. The acoustic features are processed by the vocoder to output speech audio corresponding to the acoustic features. The synthesizer and vocoder may be pre-trained using recordings or input from speakers for whom there are many speech samples, enabling the learning of an accurate/realistic mapping to the audio domain. Generally, the acoustic features output by the synthesizer closely match the characteristics of the acoustic features used to train the synthesizer. After refining the voice convertor with speech samples provided by the player, the voice convertor is used to convert/transform source acoustic features output by the synthesizer into target acoustic features corresponding to the player's voice. The target acoustic features are subsequently processed and the vocoder outputs the speech audio in the player's voice.

Various example implementations may allow speech audio to be generated in a player's voice using a small set of speech samples from the player relative to the number of speech samples required by other systems which do not employ a voice convertor as described herein. For example, training the speech audio generator system may use fewer computational resources than previous approaches which require more speech samples. In particular, using a voice convertor in the described systems and methods enables the addition of a player's voice to a speech audio generator system without requiring training of the synthesizer and/or vocoder, obviating the computational resources required to refine these components. In addition, in implementations where player speech samples (or indications thereof, e.g. acoustic features) are transmitted via a network, transmitting a small number of player speech samples may also use fewer network resources and consume less network bandwidth.

Methods and systems described herein also enable the learning of an accurate representation of a speaker's voice in the form of a speaker embedding. By learning a suitable speaker embedding for each speaker, and inputting this along with source acoustic features into the voice convertor module, the performance of the source speech audio (e.g. prosody) may be retained while realistically transforming the voice of the source speech audio into that of the player.

Example Video Game Environment

FIG. 1 illustrates an example of a computer system configured to provide a video game environment 100 to players of a video game.

The video game environment 100 includes video game server apparatus 109, and one or more client computing devices 101. Each client computing device 101 is operable by a user and provides a client in the form of gaming application 102 to the user. The client computing device 101 is configured to communicate with the video game server apparatus 109 which provides a game server 114 for providing content and functionality to the gaming application 102. For the sake of clarity, the video game environment 100 is illustrated as comprising a specific number of devices. Any of the functionality described as being performed by a specific device may instead be performed across a number of computing devices, and/or functionality described as being performed by multiple devices may be performed on a single device. For example, multiple instances of the video game server apparatus 109 (or components thereof) may be hosted as virtual machines or containers on one or more computing devices of a public or private cloud computing environment.

The video game server apparatus 109 provides speech audio generator 100. The speech audio generator receives input data representing speech content (e.g. an indication of an utterance to be synthesized as output), player identifier data for the player, and optionally, speech style features, and outputs speech audio in the player's voice corresponding to the speech content. The speech content may be determined from output of the speech content input module 103, and/or from speech scripts 108, 117. The player identifier data is any data that can be associated with (e.g. used to identify) an individual player. In some embodiments, the player identifier data is a speaker identifier, which may be for example, a different one-hot vector for each speaker whose voice can be synthesized in output of the speech audio generator 110. In other embodiments, the player identifier data are speech samples (or indications thereof, e.g. acoustic features) provided by that particular player. In some examples, the speech audio generator comprises a text-to-speech module configured to receive text data representing speech content, player identifier data for the player, and optionally, speech style features, and to output speech audio in the voice of the player.

The client computing device 101 can be any computing device suitable for providing the gaming application 102 to the user. For example, the client computing device 101 may be any of a laptop computer, a desktop computer, a tablet computer, a video games console, or a smartphone. For displaying the graphical user interfaces of computer programs to the user, the client computing device includes or is connected to a display (not shown). Input device(s) (not shown) are also included or connected to the client. Examples of suitable input devices include keyboards, touchscreens, mice, video game controllers, microphones and cameras.

Gaming application 102 provides a video game to the user of the client computing device 101. The gaming application 102 may be configured to cause the client computing device 101 to request video game content from the video game server apparatus 109 while the user is playing the video game. Requests made by the gaming application 102 are received at the request router 115 of game server 114, which processes the request, and returns a corresponding response (e.g. synthesized speech audio generated by the speech audio generator 110) to gaming application 102. Examples of requests include Application Programming Interface (API) requests, e.g. a representational state transfer (REST) call, a Simple Object Access Protocol (SOAP) call, a message queue; or any other suitable request.

The gaming application 102 provides a speech content input module 103 for use by user of computing device 101. The speech content input module 103 is configured to enable the player of the video game to input any data (e.g. text, and/or tags for paralinguistic utterances) for use in speech synthesis in their voice. The speech content input module 103 transmits data representing speech content to the request router 115, which is subsequently transmitted to the speech audio generator 110.

The data representing speech content may comprise text data. The text data may be any digital data representing text. Additionally or alternatively, the data representing speech content may comprise one or more indications of paralinguistic information. Any paralinguistic utterance may be indicated in the speech content, such as sighs, yawns, moans, laughs, grunts, etc. The speech content may be encoded by a sequence of vectors with each vector representing a character of the speech content. For example, a character may be a letter, a number, and/or a tag indicating a paralinguistic utterance. The elements of a character vector may correspond with one character out of a set of possible characters, with each character represented by a character vector with only one non-zero element (also known as a one-hot vector). Additionally or alternatively, the speech content may be represented by continuous embeddings, e.g. character embeddings and/or word embeddings. Generally, embeddings are vectors of a learned embedding space. Phoneme information may also be included in the input data, which may be determined by the speech audio generator no.

The gaming application 102 provides an audio input module 104 for use by the user of computing device 101. The audio input module 104 is configured to enable the player of the video game to input player speech samples for use in refining the voice convertor 112 (or components thereof) of speech audio generator 110. The audio input module 104 transmits player speech audio to the request router 115, which is subsequently transmitted to the speech audio generator no. The player speech audio may be any suitable digital data and may for example represent a waveform of the player speech samples (e.g. transmitted as an MP3 file, a WAV file, etc). The player speech audio may comprise acoustic features of the player speech sample. Acoustic features may comprise any low-level acoustic representation of frequency, magnitude and phase information such as linear spectrograms, log-mel-spectrograms, linear predictive coding (LPC) coefficients, Mel-Frequency Cepstral Coefficients (MFCC), log fundamental frequency (LFO), band aperiodicity (bap) or combinations thereof. The acoustic features may comprise a sequence of vectors, each vector representing acoustic information in a short time period, e.g. 50 milliseconds.

The gaming application 102 provides an audio receiver module 105 configured to receive output of the speech audio generator no. The audio receiver module 105 may be configured to request speech audio from the speech audio generator 110 throughout different stages of the video game. For example, some of the speech content may be predetermined (e.g. stored in speech scripts 108, 117) and so the audio receiver module 105 may request synthesized speech audio for the predetermined content at the same time, e.g. during a loading process. As another example, the audio receiver module 105 may request synthesized speech audio subsequent to the player inputting data into speech content input module 103. The speech audio may be received at the audio receiver module 105 as a waveform (e.g. represented in an MP4 file, a WAV file, etc).

The gaming application 102 comprises game content 106 accessed while the video game is being played by the player. The game content 106 includes speech audio 107, and speech script 108, and other assets such as markup-language files, scripts, images and music. The speech audio 107 comprises audio data for entities/characters in the video game, which may be output by the gaming application 102 at appropriate stages of the video game, e.g. if a player decides not to add their voice to speech audio generator 110.

The speech audio 107 (or a portion thereof) has corresponding speech scripts 108 which are transcriptions of the speech audio 107.

The speech audio 107 and/or speech scripts 108 are also used when the player is adding their voice to speech audio generator 110. During an initialization process, the player is provided with examples of speech audio 107 and/or speech script 108 and is asked to provide player speech samples corresponding to the speech audio 107 and/or speech script 108, which samples are used to refine (i.e. further train) the voice convertor 112 (or components thereof). For example, a transcript may be provided from speech script 108 for the user to recite. Additionally, or alternatively, the user may be asked to mimic an example of speech audio 107 such that the player speaks the same words as the example, in a speech style (e.g. prosody) similar to that of the example. The resulting player speech sample may be associated with the example of speech audio 107 as a "paired" training example for use in refining the voice convertor 112 (or components thereof), as will be described in relation to FIGS. 6 and 7. In some implementations, speech audio 107 and/or speech scripts 117 may also be stored at game server 114.

As will be described in further detail in relation to FIG. 2, the speech audio generator 110 comprises a synthesizer 111, a voice convertor 112, and a vocoder 113. The synthesizer 111 receives input data representing speech content to produce source acoustic features, which are transformed by the voice convertor 112 into target acoustic features in accordance with player identifier data. Speech audio in the player's voice is output by the vocoder 113 after processing the target acoustic features.

The video game server apparatus 109 provides the game server 114, which communicates with the client-side gaming application 102. As shown in FIG. 1, the game server 114 includes request router 115, and optionally, speech audio 116 and speech script 117 as described previously. The request router 115 receives requests from the gaming application 102, and provides video game content responsive to the request to the gaming application 102. Examples of requests include Application Programming Interface (API) requests, e.g. a representational state transfer (REST) call, a Simple Object Access Protocol (SOAP) call, a message queue; or any other suitable request.

Although FIG. 1 shows the speech audio generator 110 implemented by video game server apparatus 109, it will be appreciated that one or more components of the speech audio generator 110 may be implemented by computing device 101. For example, one or more components of the voice convertor 112 may be implemented by computing device 101, avoiding the need for player speech samples to be transmitted to video game server apparatus 109.

Example Speech Audio Generator System

Figure 2:
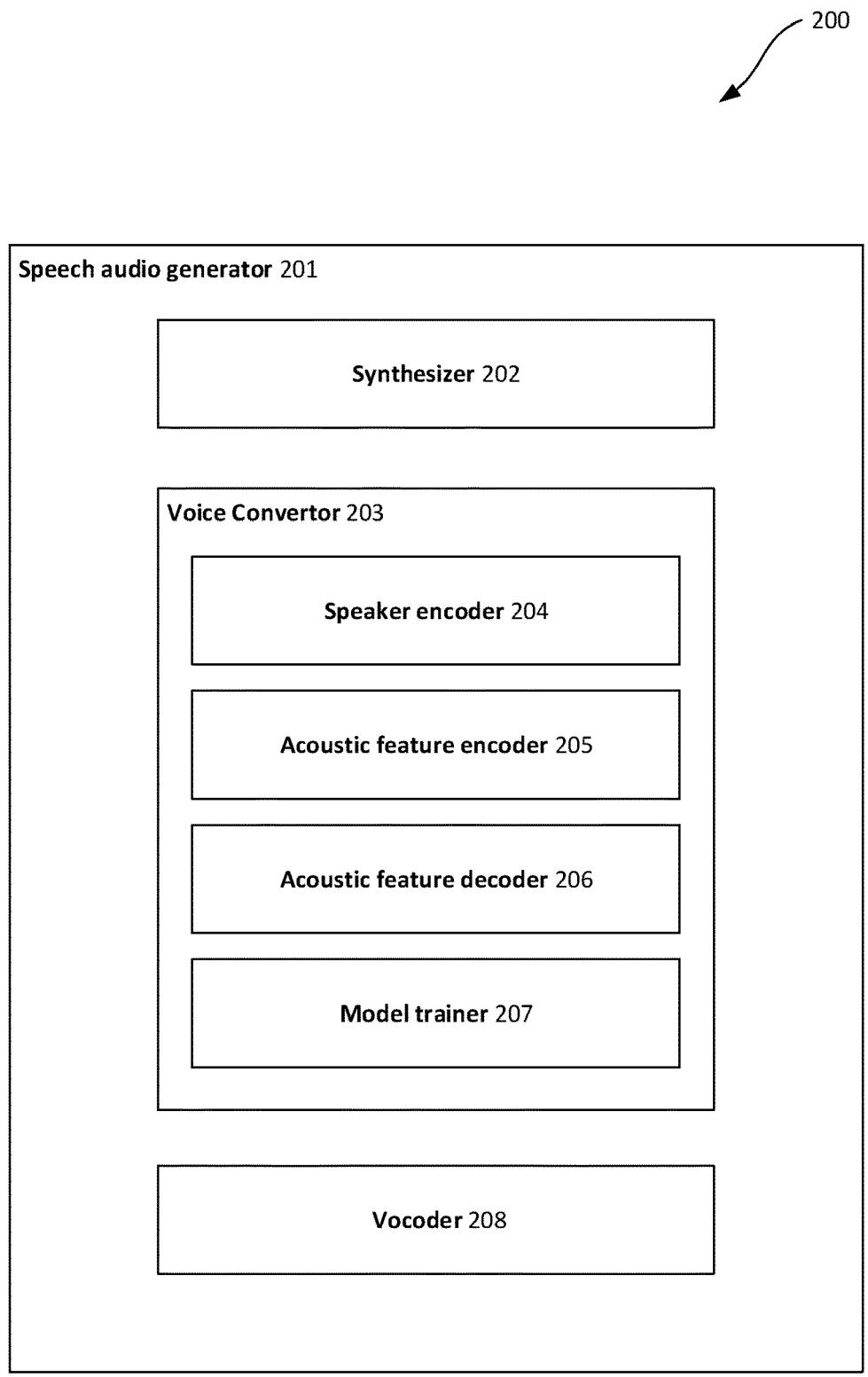
FIG. 2 is a schematic block diagram illustrating an example of a computer system having a speech audio generator for generating speech audio in a voice of a player of a video game using a voice convertor.

FIG. 2 is a schematic block diagram illustrating an example of a computer system 200 configured to provide a speech audio generator for generating speech audio in a voice of a player of a video game, using a voice convertor.

The speech audio generator 201 comprises a synthesizer 202. The synthesizer 202 is a machine-learned model which receives input data representing speech content, and optionally, speech style features, and outputs a sequence of source acoustic features.

The synthesizer 202 may be pre-trained using recordings or input from speakers for whom there are many speech samples. For example, the synthesizer 202 may be pre-trained using training examples derived from speech samples wherein each training example comprises ground-truth acoustic features for the respective speech sample, and a corresponding transcript for the speech content of the speech sample. In addition, each training example may further comprise speech style features (e.g. prosodic features) for the speech sample. The synthesizer processes the input data representing speech content and the (optional) speech style features of one or more training examples and generates predicted acoustic features for the one or more training examples. The synthesizer is trained in dependence on an objective function, wherein the objective function comprises a comparison between the predicted acoustic features and the ground-truth acoustic features. The parameters of the synthesizer 202 are updated by optimizing the objective function using any suitable optimization procedure. For example, the objective function may be optimized using gradient-based methods such as stochastic gradient descent, mini-batch gradient descent, or batch gradient descent.

The synthesizer 202 may comprise a speech content encoder to generate one or more speech content encodings for the input data. The input data comprises an indication of an utterance for each of a plurality of input time steps. The speech content encoder may comprise a recurrent neural network comprising one or more recurrent layers. Each recurrent layer comprises a hidden state that is updated as the recurrent neural network processes the input data. For each time step, recurrent layer receives its hidden state from the previous time step, and an input to the recurrent layer for the current time step. For example, an input for a first recurrent layer comprises a portion of the input data for a particular time step. An input for a subsequent recurrent layer may comprise a hidden state of a previous recurrent layer. A recurrent layer processes its previous hidden state and the current input in accordance with its parameters and generates an updated hidden state for the current time step. For example, recurrent layer may apply a first linear transformation to the previous hidden state and a second linear transformation to the current input and combine the results of the two linear transformations e.g. by adding the two results together. Recurrent layer may apply a non-linear activation function (e.g. a tanh activation function, a sigmoid activation function, a ReLU activation function, etc.) to generate an updated hidden state for the current time step.

In some embodiments, the synthesizer 202 may further comprise a speech style encoder to generate a speech style encoding from speech style features. The speech style encoder may comprise a feedforward network comprising one or more fully connected layers. Each fully connected layer receives an input and applies a learned linear transformation to the input. The fully connected layer may further apply a non-linear transformation to generate an output for the layer. The input of a first fully connected layer comprises the speech style features, and the input to subsequent fully connected layers comprises the output of a previous fully connected layer.

Speech content encodings and speech style encodings may be combined to generate one or more combined encodings. A combining operation may comprise any binary operation resulting in a single encoding. For example, the combination may be performed by an addition, an averaging, a dot product, or a Hadamard product. Source acoustic features may be generated from processing the combined output. The generating may comprise decoding the one or more combined encodings by a decoder of the synthesizer to generate source acoustic features. The decoder may comprise one or more recurrent layers. The decoder may further comprise an attention mechanism. For each output time step of a plurality of output time steps, the combined encoding for each input time step may be received. The attention mechanism may generate an attention weight for each combined encoding. The attention mechanism may generate a context vector for the output time step by averaging each combined encoding using the respective attention weight. The decoder may process the context vector of the output time step to generate source acoustic features for the output time step.

The speech content encoder and the decoder of the synthesizer may be implemented as a single encoder-decoder model. For example, they may be combined as an encoder-decoder (e.g. sequence-to-sequence) neural network with or without attention.

The speech audio generator 201 comprises a voice convertor 203 used to transform source acoustic features into target acoustic features. The voice convertor 203 comprises machine-learned models that may be initially trained using speech samples used to train the synthesizer, and then refined using model trainer 207 with speech samples provided by the player in order to generate target acoustic features corresponding to the speech content in the player's voice.

The voice convertor 203 comprises a speaker encoder 204, acoustic feature encoder 205, acoustic feature decoder 206, and model trainer 207.

The speaker encoder 204 receives player identifier data and outputs a speaker embedding. The speaker embedding is a representation of the voice of the player associated with player identifier data. The speaker embedding is a vector of a learned embedding space, such that different speakers are represented in different regions of the embedding space.

In some embodiments, and as will be discussed described relation to FIG. 5, the speaker encoder 204 has been trained separately to acoustic feature encoder 205 and acoustic feature decoder 206. In these embodiments, the speaker encoder 204 may comprise a recurrent neural network comprising one or more recurrent layers. The recurrent neural network is configured to receive player identifier data comprising speech audio (or acoustic features thereof) from a particular player.

In some embodiments, and as will be described in relation to FIG. 7, the speaker encoder 204 has been trained jointly with acoustic feature encoder 207. In these embodiments, the speaker encoder 204 may comprise a feedforward neural network comprising one or more fully connected layers. The feedforward neural network is configured to receive player identifier data comprising a speaker identifier for a particular player.

The acoustic feature encoder 205 receives a target speaker embedding and source acoustic features and outputs one or more acoustic feature encodings. The acoustic feature encoder 205 may comprise a recurrent neural network comprising one or more recurrent layers.

The acoustic feature decoder 206 receives one or more acoustic feature encodings and outputs a sequence of target acoustic features. The acoustic feature decoder 206 may comprise a recurrent neural network comprising one or more recurrent layers.

Although depicted in FIG. 2 as two separate components, it will be appreciated that the acoustic feature encoder 205 and acoustic feature decoder 206 may be combined as a single encoder-decoder model. For example, they may be combined as an encoder-decoder (e.g. sequence-to-sequence) neural network with or without attention.

Model trainer 207 is used, after an initial training procedure for the components of the voice convertor 203, to refine components of the voice convertor 203 when adding a player's voice to the speech audio generator 201. During the process of adding the player's voice to the speech audio generator 201, the player provides speech samples from which acoustic features are determined to refine (i.e. further train) the acoustic feature encoder 205, and acoustic feature decoder 206. In some implementations, the speaker encoder 204 is also refined using the player speech samples.

The player speech samples may be used to form a "paired training example" or an "unpaired training example". In a "paired training example", the player speech sample closely matches an example used to train components of the voice convertor module 203. For example, the user may be asked to mimic an example of speech audio such that the player speaks the same words as the example, in a speech style (e.g. prosody) similar to that of the example. In some embodiments, and as will be described in relation to FIG. 7, paired training examples may be used to jointly train speaker encoder 204, acoustic feature encoder 205, and acoustic feature decoder 206. In an "unpaired training example", the player speech sample does not closely match an example used to train components of the voice convertor module 203. In some embodiments, and as will be described in relation to FIG. 5, unpaired training examples may be used to separately train speaker encoder 204.

The speech audio generator 201 comprises a vocoder 208. The vocoder 208 is a machine-learned model which is used during processing of the target acoustic features to produce a waveform of speech audio. The speech audio is synthesized speech audio in the player's voice corresponding to the speech content represented in the input data. The vocoder 208 may comprise a recurrent neural network comprising one or more recurrent layers.

The vocoder 208 may be pre-trained using recordings or input from speakers for whom there are many speech samples. In some cases, the same vocoder 208 may be used for many speakers without the need for retraining based on new speakers, i.e. the vocoder 208 may comprise a universal vocoder. For example, the vocoder 208 may be pre-trained using training examples derived from speech samples wherein each training example comprises acoustic features for the speech sample and a corresponding ground-truth waveform of speech audio. The vocoder 208 processes the acoustic features of one or more training examples and generates a predicted waveform of speech audio for the one or more training examples. The vocoder 208 is trained in dependence on an objective function, wherein the objective function comprises a comparison between the predicted waveform of speech audio and the ground-truth waveform of speech audio. The parameters of the vocoder 208 are updated by optimizing the objective function using any suitable optimization procedure. For example, the objective function may be optimized using gradient-based methods such as stochastic gradient descent, mini-batch gradient descent, or batch gradient descent.

Example Speech Audio Generator Method

Figure 3:
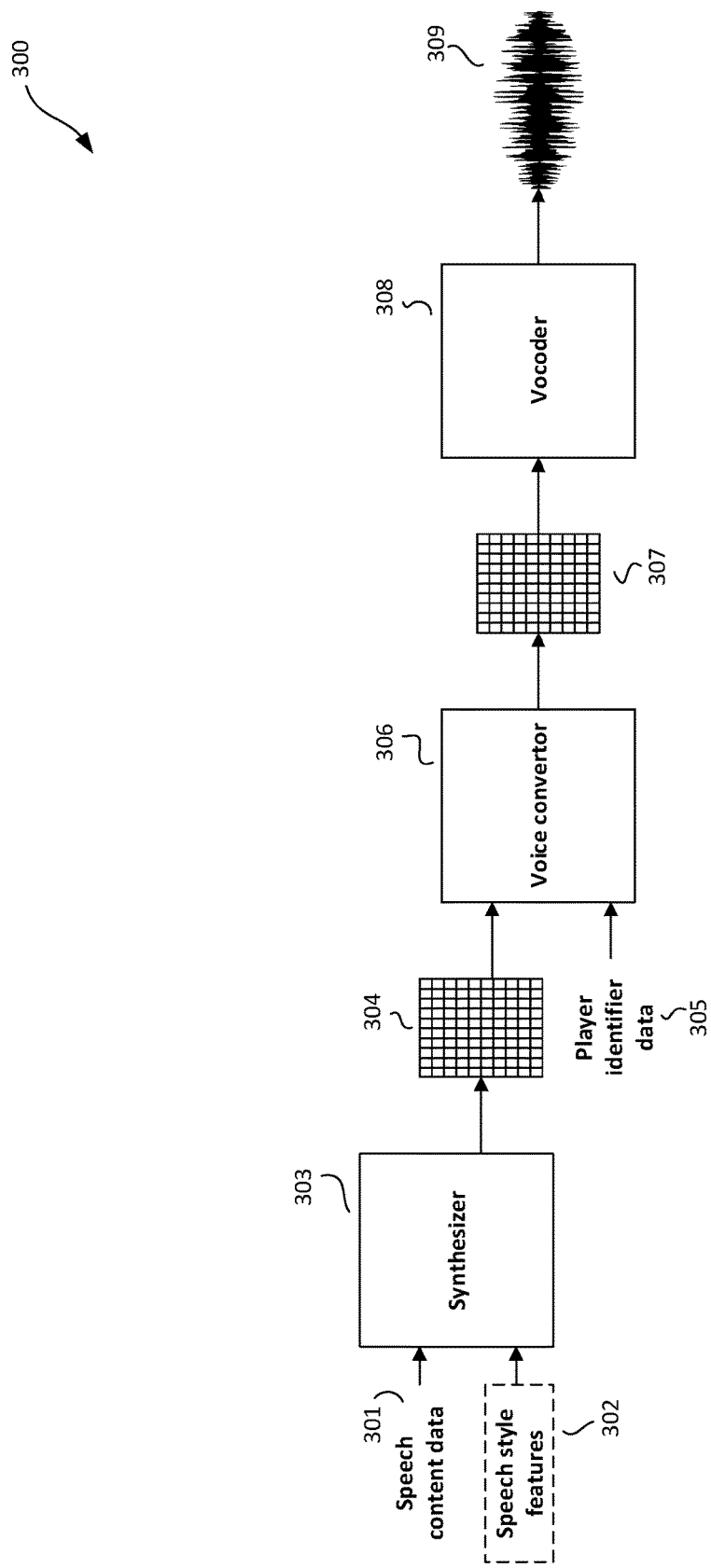
FIG. 3 illustrates an example method for generating speech audio in a voice of a player of a video game using a voice convertor.

FIG. 3 illustrates an example method for a speech audio generator 300 for generating speech audio in a voice of a player of a video game, using a voice convertor. The method shown in FIG. 3 corresponds to the processing performed by components of the speech audio generator described in relation to FIG. 2.

The synthesizer 303 is configured to receive input data representing speech content 301, and optionally, speech style features 302.

The input data may comprise any suitable representation of speech content. The speech content represented by the input data may include (or be) lexical utterances such as words, non-lexical utterances, or a combination of lexical and non-lexical utterances. Non-lexical utterances may include noises (e.g. a sigh or moan), disfluencies (e.g. um, oh, uk), and the like. Any paralinguistic utterance may be indicated in the input data, such as sighs, yawns, moans, laughs, grunts, etc. The speech content 301 may be encoded by a sequence of vectors with each vector representing a character of the speech content 301. For example, a character may be a letter, a number, and/or a tag (e.g. indicating a paralinguistic utterance). The elements of a character vector may correspond with one character out of a set of possible characters, with each character represented by a character vector with only one non-zero element (also known as a one-hot vector). Additionally or alternatively, the speech content 301 may be represented by continuous embeddings, e.g. character embeddings and/or word embeddings. Generally, embeddings are vectors of a learned embedding space. Phoneme information may also be included in the input data. In some embodiments the input data may comprise text data. The text data may be any digital data representing text.

The speech style features may be any features representing aspects of speech style. For example, the speech style features may comprise prosodic features and/or source speaker attribute information. Prosodic features are features which capture aspects of speech prosody such as intonation, stress, rhythm, and style of speech. Speaker attribute information is information that captures characteristics of the source speaker in the synthesized source acoustic features. For example, source speaker attribute information may comprise at least one of an age, a gender, and an accent type.

The input data representing speech content 301, and optionally, speech style features 302, are processed by the synthesizer 303 to output source acoustic features 304. The synthesizer 303 may comprise a speech content encoder to generate one or more speech content encodings for the speech content 301. In some embodiments, the synthesizer 303 may further comprise a speech style encoder to generate a speech style encoding from speech style features 302. Speech content encodings and speech style encodings may be combined to generate one or more combined encodings. A combining operation may comprise any binary operation resulting in a single encoding. For example, the combination may be performed by an addition, an averaging, a dot product, or a Hadamard product. Source acoustic features may be generated from processing the combined output. The generating may comprise decoding the one or more combined encodings by a decoder of the synthesizer to generate source acoustic features.

The source acoustic features 304 comprise acoustic features for the speech content 301 in a source speaker's voice (and, if appropriate, in a speech style specified by speech style features 302). The source speaker may be a speaker whose voice samples were used to initially train synthesizer 303. Acoustic features may comprise any low-level acoustic representation of frequency, magnitude and phase information such as linear spectrograms, log-mel-spectrograms, linear predictive coding (LPC) coefficients, Mel-Frequency Cepstral Coefficients (MFCC), log fundamental frequency (LFO), band aperiodicity (bap) or combinations thereof. The acoustic features may comprise a sequence of vectors, each vector representing acoustic information in a short time period, e.g. 50 milliseconds.

The voice convertor 306 is configured to receive the source acoustic features 304 and player identifier data 305. The player identifier data 305 is any data that can be associated with (e.g. used to identify) an individual player.

In some embodiments, the player identifier data 305 is a speaker identifier, which may be for example, a different one-hot vector for each speaker whose voice can be synthesized in output of the speech audio generator 300. In other embodiments, the player identifier data 305 are speech samples (or acoustic features thereof) provided by that particular player. The source acoustic features 304 and player identifier data 305 are processed by the voice convertor module 306 to output target acoustic features 307. The target acoustic features 307 comprise acoustic features for the speech content 301, but in a voice of the player associated with player identifier data 305 (and, if appropriate, in a speech style specified by speech style features 302).

The vocoder 308 is configured to receive the target acoustic features 307. The vocoder 308 processes the target acoustic features to produce a waveform of speech audio 309. The speech audio 309 is synthesized speech audio in the player's voice corresponding to the speech content 301. The speech audio 309 comprises an amplitude sample for each of a plurality of audio frames.

Voice Convertor Method

Figure 4:
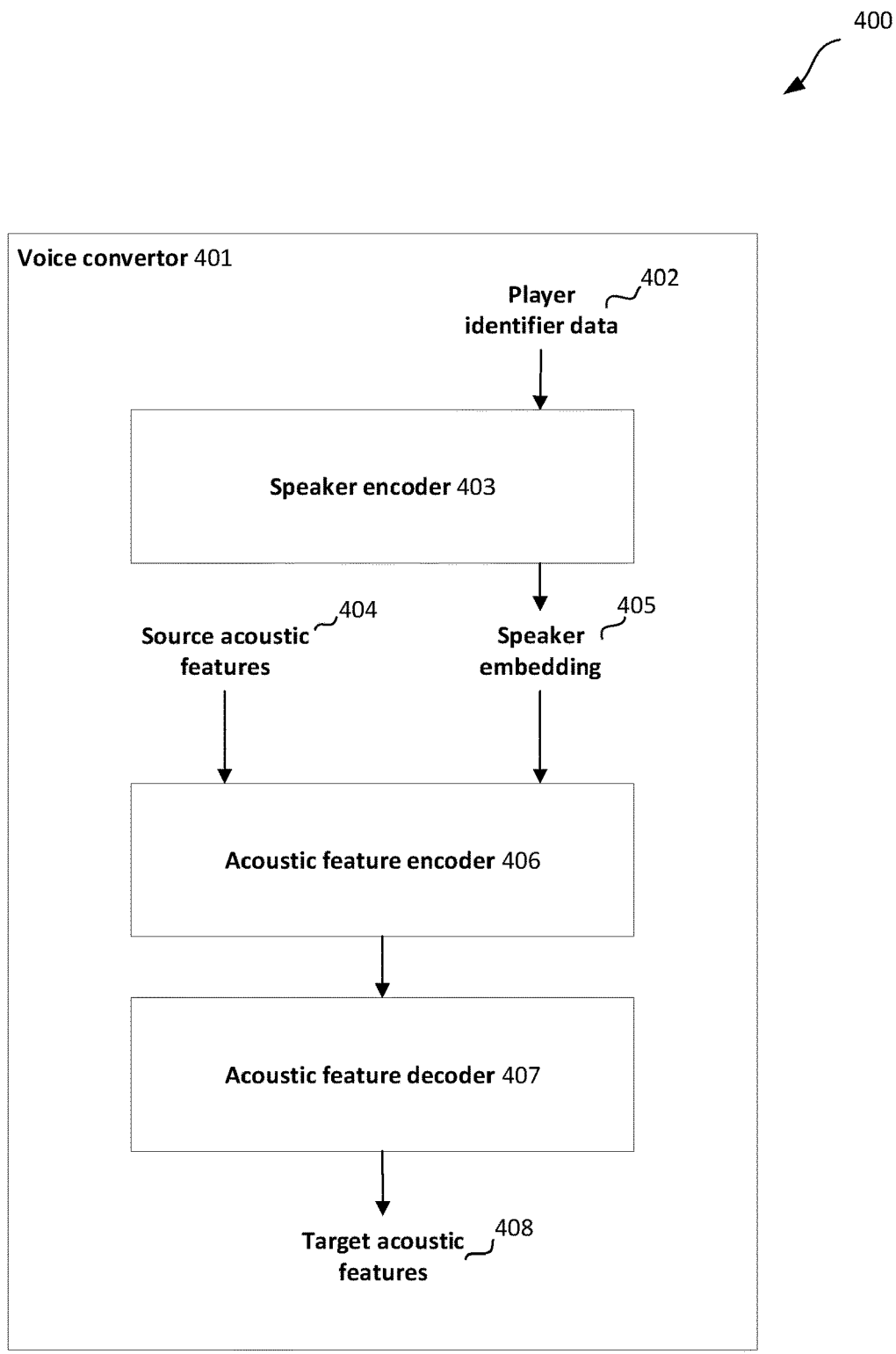
FIG. 4 illustrates an example method for transforming source acoustic features into target acoustic features.

FIG. 4 illustrates an example method 400 for a voice convertor configured to transform source acoustic features into target acoustic features.

The voice convertor 401 comprises a speaker encoder 403, an acoustic feature encoder 406, and an acoustic feature decoder 407.

The speaker encoder 403 is configured to receive player identifier data 402. The player identifier data 402 is any data that can be associated with (e.g. used to identify) an individual player. In some embodiments, the player identifier data is a speaker identifier, which may be for example, a different one-hot vector for each speaker whose voice can be synthesized in output of the speech audio generator 110. In other embodiments, the player identifier data are speech samples (or indications thereof, e.g. acoustic features) provided by that particular player.

The speaker encoder 403 processes the player identifier data 402 and outputs speaker embedding 405. The speaker embedding 405 is a representation of the voice of the player associated with player identifier data 402. The speaker embedding 405 is a vector of a learned embedding space, such that different speakers are represented in different regions of the embedding space. In embodiments where the player identifier data 402 comprises player speech samples (or acoustic features thereof), the speaker embedding 405 may be determined from an average of one or more embeddings which each may be determined by inputting a different player speech sample (or acoustic features thereof) into speaker encoder 403.

Acoustic feature encoder 406 is configured to receive source acoustic features 404 and target speaker embedding 405. The acoustic feature encoder outputs one or more acoustic feature encodings. An acoustic feature encoding may be determined for each input time step of a plurality of input time steps of the source acoustic features. The acoustic feature encoding for each input time step may comprise a combination of the speaker embedding for the player and an encoding of the source acoustic features for the input time step. For example, the combination may be performed by a concatenation operation, an addition operation, a dot product operation, etc.

Acoustic feature decoder 407 is configured to receive the one or more acoustic feature encodings output by acoustic feature encoder 406. The acoustic feature decoder 407 outputs target acoustic features 408. The target acoustic features 408 comprises target acoustic features for a plurality of output time steps. The acoustic feature decoder 407 may comprise an attention mechanism. For each output time step of the plurality of output time steps, the acoustic feature encoding for each input time step may be received. The attention mechanism may generate an attention weight for each acoustic feature encoding. The attention mechanism may generate a context vector for the output time step by averaging each acoustic feature encoding using the respective attention weight. The acoustic feature decoder 407 may process the context vector of the output time step to generate target acoustic features for the output time step.

Speaker Encoder Training Method

Figure 5:
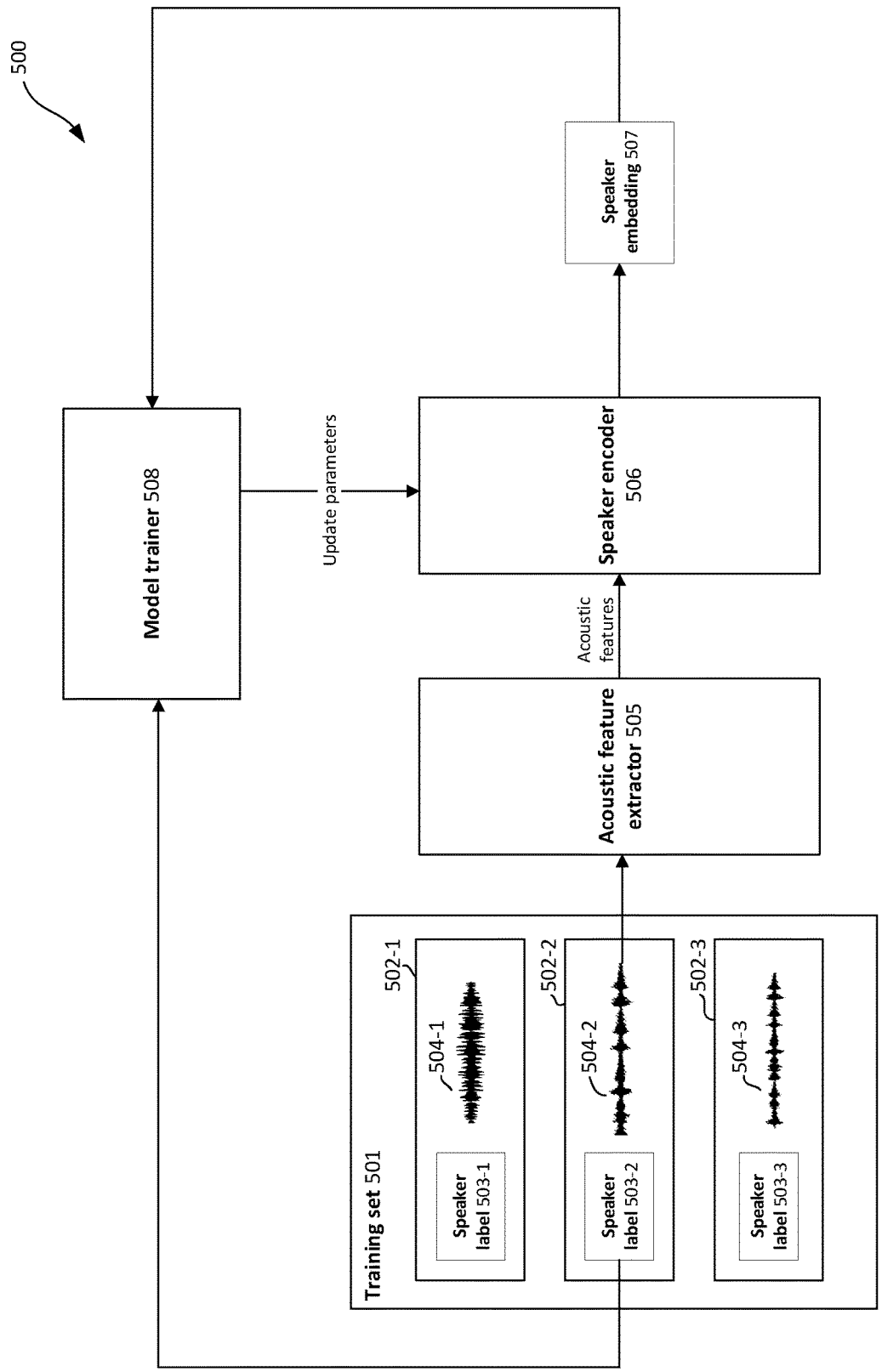
FIG. 5 illustrates an example method for training a speaker encoder to generate speaker embeddings.

FIG. 5 illustrates an example method 500 for training a speaker encoder to generate speaker embeddings. In the embodiment depicted in FIG. 5, the speaker encoder 506 is trained separately to the acoustic feature encoder and acoustic feature decoder. The separate training of the acoustic feature encoder and acoustic feature decoder will be described in relation to FIG. 6.

As shown in FIG. 5, the speaker encoder is being trained on a speaker verification task, although it will be appreciated that the speaker encoder may be trained on other similar tasks (such as speaker classification). In the speaker verification task, speech audio (or acoustic features thereof) is processed in order to verify the speaker's identity. Separate training of the speaker encoder 506 may result in a more representative speaker encoder, such that speaker embeddings 507 output by the speaker encoder 506 more accurately reflect the characteristics of a speaker's voice. For example, speech samples spoken by the same speaker may have different embeddings, which are close to each other (in an embedding space) compared to embeddings for speech samples from different speakers. In cases where the performance of the speaker is different in speech samples provided by that speaker (for example whispering compared to screaming), the variety in performance may be captured in the embeddings since a different embedding is output for each speech sample. In addition, speaker encoder 506 may have sufficient representation power to encode speech audio from speakers that are not present in the training set used to train the speaker encoder 506. Given a new speaker, the speaker encoder 506 may not need to be retrained and can be used as preprocessing module to obtain speaker embeddings. Furthermore, unpaired training examples may be used to train speaker encoder 506, allowing a large corpus of publicly available data to be used to train the speaker encoder 506.

The speaker encoder 506 is trained using training set 501 comprising training examples 502-1, 502-2, 502-3. Each training example 502 comprises speech audio 504 and a speaker label 503 corresponding to the speaker identity of the respective speech audio 504. For example, if speech audio 504-1 and speech audio 504-2 were provided by the same speaker, then speaker labels 503-1 and 503-2 are identical. Speaker label 503-3 is different to that of speaker labels 503-1, 503-2 if speech audio 504-3 was provided by a different speaker to that of speech audio 504-1, 504-2. Speaker labels 503 may be represented by one hot vectors such that a different one-hot vector indicates each speaker in the training set 501. In general, the training set 501 comprises a plurality of examples of speech audio 504 for each speaker.

As shown in FIG. 5, speech audio 504-2 of training example 502-2 is processed by acoustic feature extractor 505 to determine acoustic features for speech audio 504-2. Acoustic feature extractor 505 may determine acoustic features in any suitable manner, e.g. by performing a Fast Fourier Transform on speech audio 504. Acoustic features determined by the acoustic feature extractor 505 may comprise any low-level acoustic representation of frequency, magnitude and phase information such as linear spectrograms, log-mel-spectrograms, linear predictive coding (LPC) coefficients, Mel-Frequency Cepstral Coefficients (MFCC), log fundamental frequency (LFO), band aperiodicity (bap) or combinations thereof. The acoustic features may comprise a sequence of vectors, each vector representing acoustic information in a short time period, e.g. 50 milliseconds.

The acoustic features are received by speaker encoder 506, which processes the acoustic features in accordance with a current set of parameters and outputs a speaker embedding 507 for speech audio 504-2.

The speaker embedding 507 is processed in order to verify the speaker identity of speech audio 504-2. For example, the speaker embedding 507 may be used as part of a generalized end-to-end speaker loss, with the speaker encoder 506 trained to optimize the loss. The generalized end-to-end speaker loss may be used to train the speaker encoder 506 to output embeddings of utterances from the same speaker with a high similarity (which may be measured by cosine similarity), while those of utterances from different speakers are far apart in the embedding space. For example, the generalized end-to-end speaker loss may involve finding a centroid for each speaker by averaging embeddings for speech samples provided by the speaker. A similarity matrix may be determined measuring the similarity (e.g. cosine similarity, or a linear transformation thereof) between the embedding for each utterance in a training batch and the centroid for each speaker. The generalized end-to-end speaker loss may encourage the similarity matrix to have high values for matching speaker-centroid values (e.g. values representing a similarity between an embedding for an utterance by a speaker and the centroid for the same speaker), and low values for non-matching speaker-centroid values. Alternatively, the speaker embedding for speech audio 504-2 may be received by an output classification layer which processes the speaker embedding in accordance with a current set of parameters, and outputs a speaker identity output. For example, the output classification layer may comprise a softmax layer, and the speaker identity output may comprise a probability vector indicating a probability, for each speaker out of the set of speakers included in the training set 501, that speech audio 504-2 was provided by the speaker.

Model trainer 508 receives speaker embedding 507 for speech audio 504-2, and speaker label 503-2 for speech audio 504-2 and updates the parameters of speaker encoder 506 in order to optimize an objective function. The objective function comprises a loss in dependence on the speaker label 503-2 and speaker embedding 507. For example, the loss may measure a cross-entropy loss between speaker label 503-2 and a speaker identity output. The objective function may additionally comprise a regularization term, for example the objective function may be a linear combination of the loss and the regularization term. The parameters of the speaker encoder 506 may be updated by optimizing the objective function using any suitable optimization procedure. For example, the objective function may be optimized using gradient-based methods such as stochastic gradient descent, mini-batch gradient descent, or batch gradient descent, including momentum-based methods such as Adam, RMSProp, and AdaGrad. In the event that an output classification layer is included, optimizing the objective function using the model trainer 508 may include updating the parameters of the output classification layer.

Although FIG. 5 shows the training process with processing of a single training example, it will be appreciated that any number of training examples may be used when updating the parameters of the speaker encoder 506. The training process is repeated for a number of passes through the training set 501, and is terminated at a suitable point in time, e.g. when a speaker identity output derived from speaker embedding 507 can be reliably used to correctly verify speaker identity. After training has completed, the speaker encoder 506 is retained for use in generating speaker embeddings for speech samples, as described previously.

Acoustic Feature Encoder/Decoder Training Method

Figure 6:
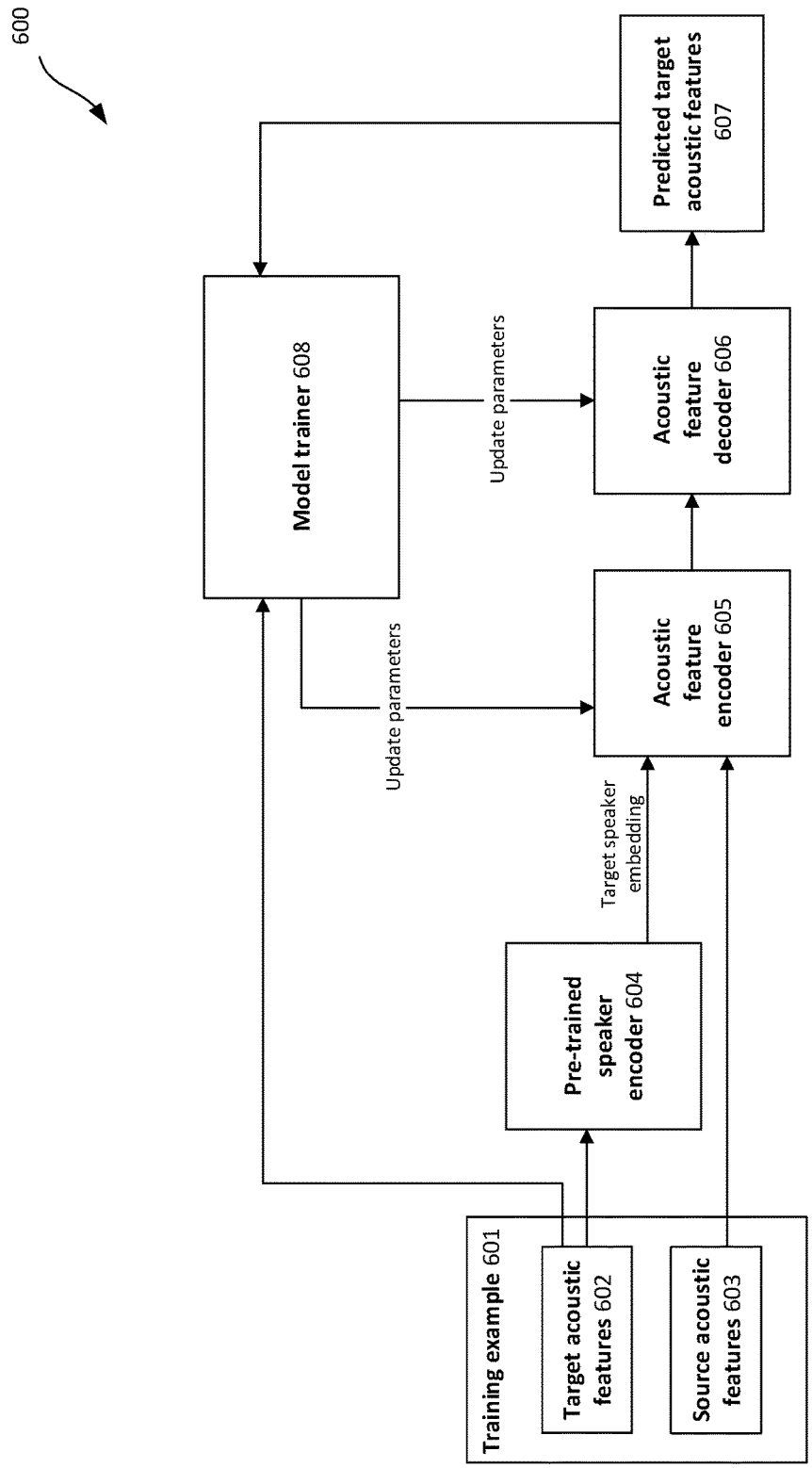
FIG. 6 illustrates an example method for training an acoustic feature encoder and an acoustic feature decoder to generate target acoustic features.

FIG. 6 illustrates an example method 600 for training an acoustic feature encoder and an acoustic feature decoder to generate target acoustic features. The method displayed in FIG. 6 occurs after separate training of the speaker encoder, resulting in a pre-trained speaker encoder 604, as described in relation to FIG. 5. During the training process displayed in FIG. 6, the parameters of the pre-trained speaker encoder 604 are fixed. The acoustic feature encoder 605 and acoustic feature decoder 606 are initially trained prior to adding a new player's voice and are subsequently refined when the player adds their voice and provides player speech samples.

As shown in FIG. 6, acoustic feature encoder 605 and acoustic feature decoder 606 are trained on a voice conversion task using one or more training examples 601. In a voice conversion task, source acoustic features are transformed into target acoustic features such that synthesized speech audio from the target acoustic features closely match the content and performance of the source acoustic features, while changing the voice represented in the source acoustic features into that of the target speaker.

Training example 601 comprises source acoustic features 603 and corresponding target acoustic features 602. During training, the goal of the acoustic feature encoder 605 and the acoustic feature decoder 606 is to transform source acoustic features 603 of a training example 601 into the target acoustic features 602 of the training example 601. The training example may be referred to as a "paired" training example, wherein the source speech audio (from which the source acoustic features 603 are determined) and the target speech audio (from which the target source acoustic features 602 are determined) differ only in speaker identity. Alternatively said, the content (e.g. the words spoken) and the performance of the source and target speech audio may closely match each other in a paired training example.

When adding a new player's voice, the target acoustic features 602 correspond to acoustic features from player speech samples provided by the player. As described previously, the player speech samples may be paired with source speech audio (e.g. when the player is asked to mimic the source speech audio).

The target acoustic features 602 are received by the pre-trained speaker encoder, which processes the target acoustic features 602 in accordance with a learned set of parameters, and outputs a target speaker embedding for the target acoustic features 602.

The target speaker embedding and source acoustic features 603 are received by acoustic feature encoder 605, which processes the received inputs in accordance with a current set of parameters to output one or more acoustic feature encodings. The one or more acoustic feature encodings are processed by the acoustic feature decoder 606 in accordance with a current set of parameters to output predicted target acoustic features 607.

Model trainer 608 receives the predicted target acoustic features 607 and the "ground-truth" target acoustic features 602, and updates the parameters of acoustic feature encoder 605 and acoustic feature decoder 606 in order to optimize an objective function. The objective function comprises a loss in dependence on the predicted target acoustic features 607 and the ground-truth target acoustic features 602. For example, the loss may measure a mean-squared error between the predicted target acoustic features 607 and the ground-truth target acoustic features 602. The objective function may additionally comprise a regularization term, for example the objective function may be a linear combination of the loss and the regularization term. The objective function may further comprise other weighted losses such as speaker classifier (to emphasize that the target acoustic features have target speaker characteristics) or alignment loss (to emphasize the correct alignment between paired source and target acoustic features). The parameters of the acoustic feature encoder 605 and acoustic feature decoder 606 may be updated by optimizing the objective function using any suitable optimization procedure. For example, the objective function may be optimized using gradient-based methods such as stochastic gradient descent, mini-batch gradient descent, or batch gradient descent, including momentum-based methods such as Adam, RMSProp, and AdaGrad.

The training process is repeated for a number of training examples, and is terminated at a suitable point in time, e.g. when predicted target acoustic features 607 closely match ground-truth target acoustic features 602. After an initial training process, the acoustic feature encoder 605 and acoustic feature decoder 606 are further trained/refined using target acoustic features 602 determined from player speech samples. Subsequently, the speaker encoder 604, acoustic feature encoder 605 and acoustic feature decoder 606 can be used to convert any source acoustic features into target acoustic features corresponding to the player's voice.

Joint Training Method

Figure 7:
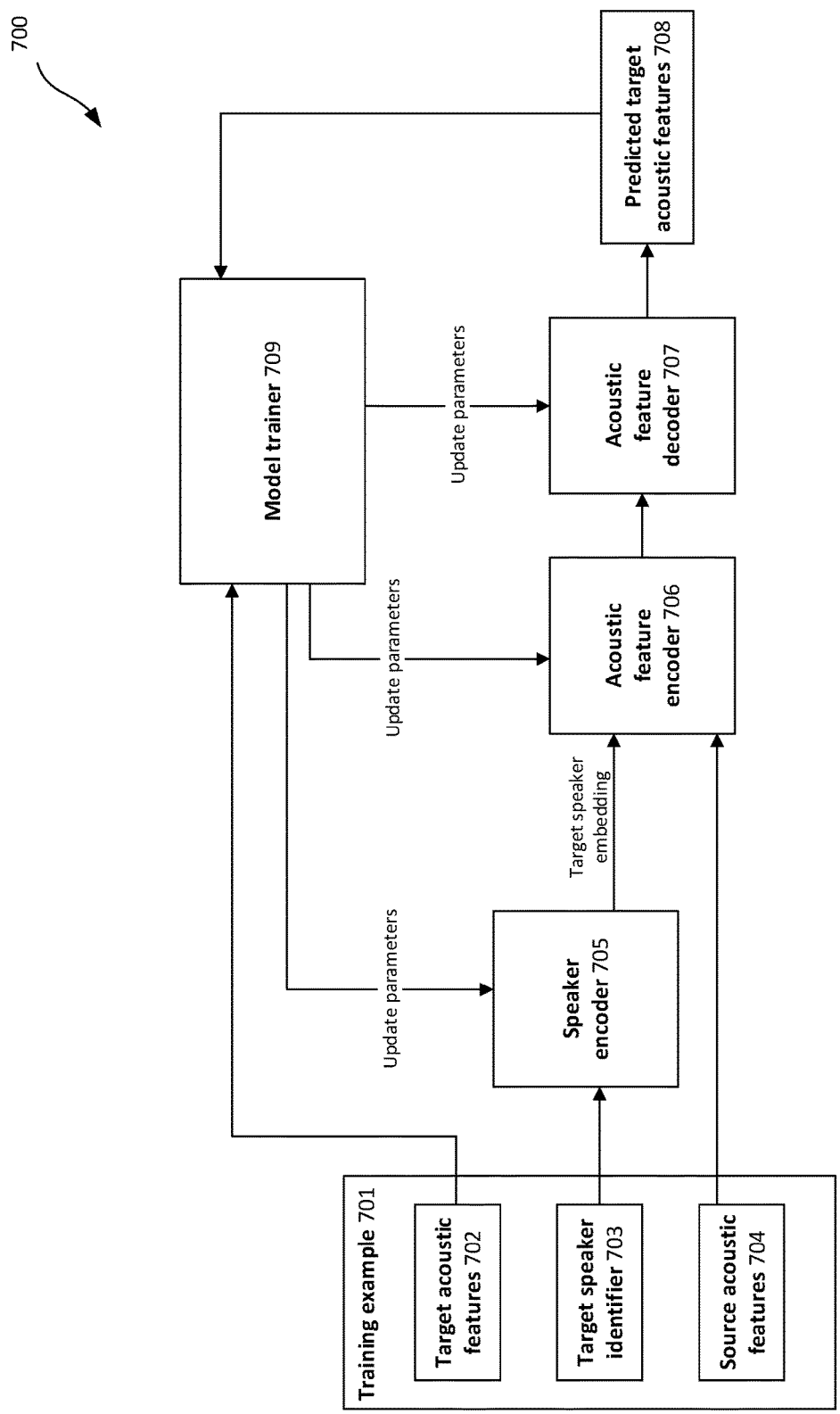
FIG. 7 illustrates an example method for training a speaker encoder, an acoustic feature encoder, and an acoustic feature decoder to generate target acoustic features.

FIG. 7 illustrates an example method 700 for training a speaker encoder, an acoustic feature encoder, and an acoustic feature decoder to generate target acoustic features. In the embodiment depicted in FIG. 7, the speaker encoder 705 is trained jointly with the acoustic feature encoder 706 and acoustic feature decoder 707 on a voice conversion task.

Training example 701 comprises source acoustic features 704, corresponding target acoustic features 702, and a target speaker identifier 703. During training, the goal is to transform source acoustic features 704 of a training example 701 into the target acoustic features 702 of the training example 701. The training example may be referred to as a "paired" training example, wherein the source speech audio (from which the source acoustic features 704 are determined) and the target speech audio (from which the target source acoustic features 702 are determined) differ only in speaker identity. Alternatively said, the content (e.g. the words spoken) and the performance of the source and target speech audio may closely match each other in a paired training example. The target speaker identifier 703 is a label used to identify the speaker corresponding to target acoustic features 702. Training examples 701 with target acoustic features corresponding to the same speaker have identical target speaker identifiers 703. Target speaker identifiers 703 may be represented by one hot vectors such that a different one-hot vector indicates each speaker in the training set 501. In addition, one or more one-hot vectors may be reserved as target speaker identifiers 703 for players who wish to synthesize speech audio in their voice.

Target speaker identifier 703 is received by speaker encoder 705, which processes the target speaker identifier 703 in accordance with a current set of parameters and outputs a target speaker embedding for the target speaker.

The target speaker embedding and source acoustic features 704 are received by acoustic feature encoder 706, which processes the received inputs in accordance with a current set of parameters to output one or more acoustic feature encodings. The one or more acoustic feature encodings are processed by the acoustic feature decoder 707 in accordance with a current set of parameters to output predicted target acoustic features 708.

Model trainer 709 receives the predicted target acoustic features 708 and the "ground-truth" target acoustic features 702, and updates the parameters of the speaker encoder 705, acoustic feature encoder 706 and acoustic feature decoder 707 in order to optimize an objective function. The objective function comprises a loss in dependence on the predicted target acoustic features 708 and the ground-truth target acoustic features 702. For example, the loss may measure a mean-squared error between the predicted target acoustic features 708 and the ground-truth target acoustic features 702. The objective function may additionally comprise a regularization term, for example the objective function may be a linear combination of the loss and the regularization term. The parameters of the speaker encoder 705, acoustic feature encoder 706 and acoustic feature decoder 707 may be updated by optimizing the objective function using any suitable optimization procedure. For example, the objective function may be optimized using gradient-based methods such as stochastic gradient descent, mini-batch gradient descent, or batch gradient descent, including momentum-based methods such as Adam, RMSProp, and AdaGrad.

The training process is repeated for a number of training examples, and is terminated at a suitable point in time, e.g. when predicted target acoustic features 708 closely match ground-truth target acoustic features 702. After an initial training process, the speaker encoder 705, acoustic feature encoder 706 and acoustic feature decoder 707 are further trained/refined using target acoustic features 702 determined from player speech samples. Subsequently, the speaker encoder 705, acoustic feature encoder 706 and acoustic feature decoder 707 can be used to convert any source acoustic features into target acoustic features corresponding to the player's voice.

Figure 8:
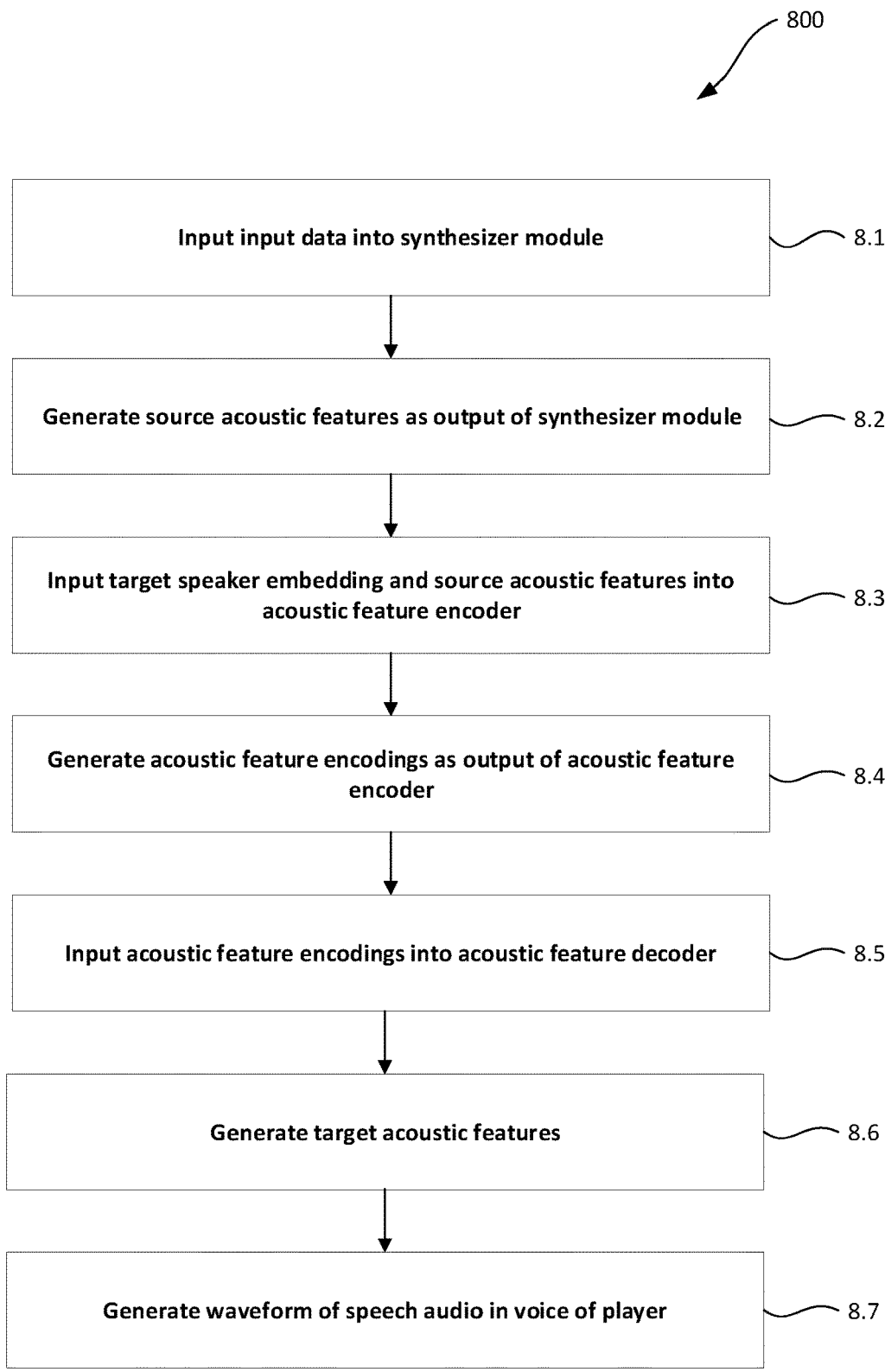
FIG. 8 is a flow diagram illustrating an example method for generating speech audio in a video game using a voice convertor that has been trained to convert acoustic features for a source speaker into acoustic features for a player of the video game.

FIG. 8 is a flow diagram 800 illustrating an example method for generating speech audio in a video game using a voice convertor that has been trained to convert acoustic features for a source speaker into acoustic features for a player of the video game.

In step 8.1, input data is inputted into a synthesizer module. The input data represents speech content. The speech content may be determined from an input of the player of the video game. Additionally, or alternatively, the speech content may be determined from content in the video game. The input data may comprise a representation of text. Additionally, or alternatively, the input data may comprise one or more indications of paralinguistic information (e.g. sighs, yawns, moans, etc.) The input data may further comprise source speaker attribute information. For example, source speaker attribute information may comprise at least one of an age, a gender, or an accent type. Additionally, or alternatively, the input data may further comprise speech style features. For example, the speech style features may comprise prosodic features.

The synthesizer may comprise neural network layers. For example, the neural network layers may comprise feedforward layers, e.g. fully connected layers and/or convolutional layers. Additionally or alternatively, the neural network layers may comprise recurrent layers, e.g. LSTM layers and/or bidirectional LSTM layers. The synthesizer 202 may comprise encoder-decoder (e.g. sequence-to-sequence) neural networks with and without attention, transformer networks, etc.

In step 8.2, source acoustic features are generated as output of the synthesizer module. The source acoustic features are acoustic features for the speech content in the voice of a source speaker.

In step 8.3, a target speaker embedding and the source acoustic features are inputted into an acoustic feature encoder of the voice convertor. The speaker embedding is a learned representation of the voice of a player of the video game. The speaker embedding may be generated from output of a speaker encoder of the voice convertor, the generating comprising inputting player identifier data into the speaker encoder. Player identifier data is any data that can be associated with (e.g. used to identify) an individual player. In some embodiments, the player identifier data may be a speaker identifier, which may be for example, a different one-hot vector for each speaker whose voice can be synthesized in output of the speech audio generator no. In other embodiments, the player identifier data may be speech samples (or indications thereof, e.g. acoustic features) provided by that particular player.

The acoustic feature encoder may comprise neural network layers. For example, the neural network layers may comprise feedforward layers, e.g. fully connected layers and/or convolutional layers. Additionally or alternatively, the neural network layers may comprise recurrent layers, e.g. LSTM layers and/or bidirectional LSTM layers.

The speaker encoder may comprise neural network layers. For example, the neural network layers may comprise feedforward layers, e.g. fully connected layers and/or convolutional layers. Additionally or alternatively, the neural network layers may comprise recurrent layers, e.g. LSTM layers and/or bidirectional LSTM layers.

In step 8.4, one or more acoustic feature encodings are generated as output of the acoustic feature encoder. The generating may comprise combining one or more source acoustic feature encodings with the target speaker embedding to generate one or more acoustic feature encodings. A combining operation may comprise any binary operation resulting in a single encoding. For example, the combination may be performed by an addition, an averaging, a dot product, or a Hadamard product.

The acoustic feature decoder may comprise neural network layers. For example, the neural network layers may comprise feedforward layers, e.g. fully connected layers and/or convolutional layers. Additionally or alternatively, the neural network layers may comprise recurrent layers, e.g. LSTM layers and/or bidirectional LSTM layers.

The acoustic feature encoder and acoustic feature decoder may be combined as a single encoder-decoder model. For example, they may be combined as an encoder-decoder (e.g. sequence-to-sequence) neural network with or without attention, or as a transformer network, etc. Furthermore, an encoder-decoder model may be implemented by architectures such as Variational Autoencoders (VAEs) and Generative Adversarial Networks (GANs).

In step 8.5, the one or more acoustic feature encodings are inputted into an acoustic feature decoder of the voice convertor module.

In step 8.6, target acoustic features are generated. The target acoustic features comprise acoustic features for the speech content in the voice of the player. The generating comprises decoding the one or more acoustic feature encodings using the acoustic feature decoder.

In step 8.7, speech audio in the voice of the player is generated. This step comprises processing the target acoustic features with one or more modules, the one or more modules comprising a vocoder configured to generate speech audio in the voice of the player.

The vocoder may comprise neural network layers. For example, the neural network layers may comprise feedforward layers, e.g. fully connected layers and/or convolutional layers. Additionally or alternatively, the neural network layers may comprise recurrent layers, e.g. LSTM layers and/or bidirectional LSTM layers.

Figure 9:
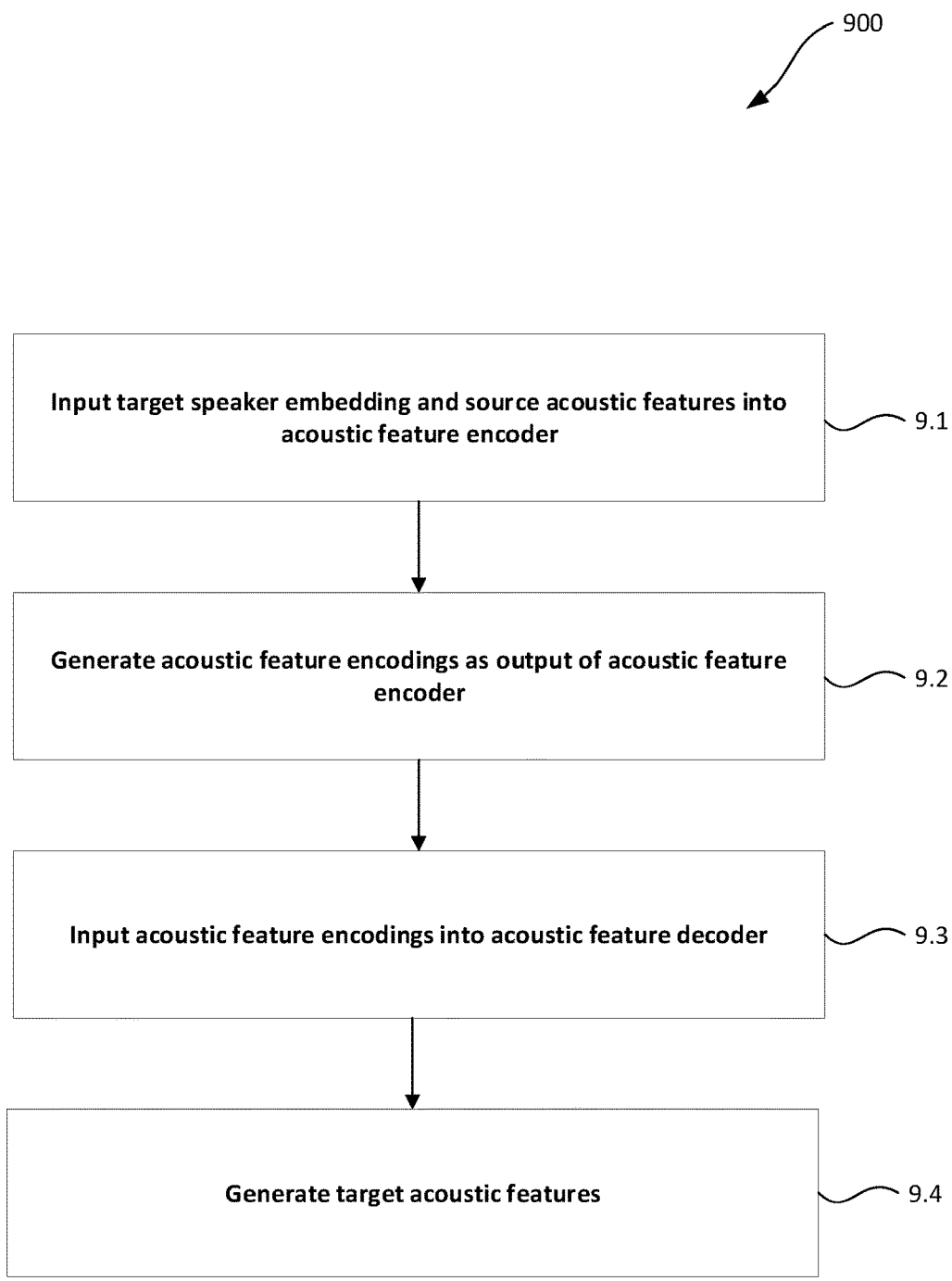
FIG. 9 is a flow diagram illustrating an example method for generating speech audio data in a video game using a voice convertor that has been trained to convert acoustic features for a source speaker into acoustic features for a player of the video game.

FIG. 9 is a flow diagram 900 is a flow diagram illustrating an example method for generating speech audio data in a video game using a voice convertor that has been trained to convert acoustic features for a source speaker into acoustic features for a player of the video game.

In step 9.1, a target speaker embedding and source acoustic features are inputted into an acoustic feature encoder of the voice convertor. The speaker embedding is a learned representation of the voice of a player of the video game. The source acoustic features are acoustic features for speech content in the voice of a source speaker.

The speaker embedding may be generated from output of a speaker encoder of the voice convertor. The generating may comprise: inputting, into the speaker encoder, one or more examples of speech audio provided by the player; generating, as output of the speaker encoder, an embedding for each example of speech audio; and generating the speaker embedding for the player based on the embeddings for each example. The speaker embedding for the player may be an average of the embeddings generated for each example. Alternatively, the generating may comprise: inputting, into the speaker encoder, a speaker identifier for the player; and generating, as output of the speaker encoder, the speaker embedding for the player.

The speaker encoder may comprise one or more recurrent layers. Additionally or alternatively, the speaker encoder may comprise one or more fully connected layers.

In step 9.2, one or more acoustic features encodings are generated as output of the acoustic feature encoder. Each of the one or more acoustic feature encodings may comprise a combination of the target speaker embedding and an encoding of the source acoustic features. The generating may comprise generating an acoustic feature encoding for each input time step of a plurality of input time steps of the source acoustic features, wherein the acoustic feature encoding for each input time step comprises a combination of the speaker embedding for the player and an encoding of the source acoustic features for the input time step.

In step 9.3, the one or more acoustic feature encodings are inputted into an acoustic feature decoder of the voice convertor.

At least one of the acoustic feature encoder or the acoustic feature decoder may comprise one or more recurrent layers.

In step 9.4, target acoustic features are generated. The target acoustic features comprise acoustic features for the speech content in the voice of the player. The generating comprises decoding the one or more acoustic feature encodings using the acoustic feature decoder. Decoding the one or more acoustic feature encodings may comprise, for each output time step of a plurality of output time steps: receiving the acoustic feature encoding for each input time step; generating, by an attention mechanism, an attention weight for each acoustic feature encoding; generating, by the attention mechanism, a context vector for the output time step by averaging each acoustic feature encoding using the respective attention weight; and processing, by the acoustic feature decoder, the context vector of the output time step to generate target acoustic features for the output time step. Speech audio data may be generated from the target acoustic features, e.g. a waveform of speech, or any other suitable representation of speech audio.

Figure 10:
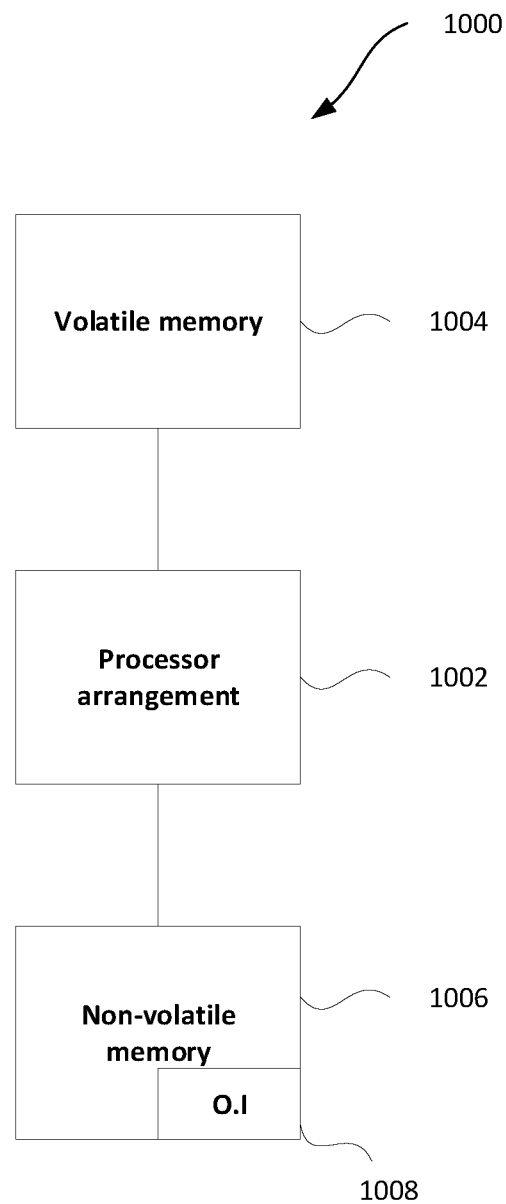
Figure 10 shows a schematic example of a system/apparatus for performing any of the methods described herein.

FIG. 10 shows a schematic example of a system/apparatus for performing methods described herein. The system/apparatus shown is an example of a computing device. It will be appreciated by the skilled person that other types of computing devices/systems may alternatively be used to implement the methods described herein, such as a distributed computing system.

The apparatus (or system) 1000 comprises one or more processors 1002. The one or more processors control operation of other components of the system/apparatus 1000. The one or more processors 1002 may, for example, comprise a general purpose processor. The one or more processors 1002 may be a single core device or a multiple core device. The one or more processors 1002 may comprise a central processing unit (CPU) or a graphical processing unit (GPU). Alternatively, the one or more processors 1002 may comprise specialised processing hardware, for instance a RISC processor or programmable hardware with embedded firmware. Multiple processors may be included.

The system/apparatus comprises a working or volatile memory 1004. The one or more processors may access the volatile memory 1004 in order to process data and may control the storage of data in memory. The volatile memory 1004 may comprise RAM of any type, for example Static RAM (SRAM), Dynamic RAM (DRAM), or it may comprise Flash memory, such as an SD-Card.

The system/apparatus comprises a non-volatile memory 1006. The non-volatile memory 1006 stores a set of operation instructions 1008 for controlling the operation of the processors 1002 in the form of computer readable instructions. The non-volatile memory 1006 may be a memory of any kind such as a Read Only Memory (ROM), a Flash memory or a magnetic drive memory.

The one or more processors 1002 are configured to execute operating instructions 1008 to cause the system/apparatus to perform any of the methods described herein. The operating instructions 1008 may comprise code (i.e. drivers) relating to the hardware components of the system/apparatus 1000, as well as code relating to the basic operation of the system/apparatus 1000. Generally speaking, the one or more processors 1002 execute one or more instructions of the operating instructions 1008, which are stored permanently or semi-permanently in the non-volatile memory 1006, using the volatile memory 1004 to temporarily store data generated during execution of said operating instructions 1008.

Implementations of the methods described herein may be realised as in digital electronic circuitry, integrated circuitry, specially designed ASICs (application specific integrated circuits), computer hardware, firmware, software, and/or combinations thereof. These may include computer program products (such as software stored on e.g. magnetic discs, optical disks, memory, Programmable Logic Devices) comprising computer readable instructions that, when executed by a computer, such as that described in relation to FIG. 10, cause the computer to perform one or more of the methods described herein.

Any system feature as described herein may also be provided as a method feature, and vice versa. As used herein, means plus function features may be expressed alternatively in terms of their corresponding structure. In particular, method aspects may be applied to system aspects, and vice versa.

Furthermore, any, some and/or all features in one aspect can be applied to any, some and/or all features in any other aspect, in any appropriate combination. It should also be appreciated that particular combinations of the various features described and defined in any aspects of the invention can be implemented and/or supplied and/or used independently.

Although several embodiments have been shown and described, it would be appreciated by those skilled in the art that changes may be made in these embodiments without departing from the principles of this disclosure, the scope of which is defined in the claims.

The invention claimed is:

1. A computer-implemented method of generating speech audio in a video game using a voice convertor that has been trained to convert acoustic features for a source speaker into acoustic features for a player of the video game, the method comprising:
   inputting, into a synthesizer module, input data representing speech content;
   generating, as output of the synthesizer module, source acoustic features for the speech content in the voice of the source speaker;
   inputting, into an acoustic feature encoder of the voice convertor, (i) a target speaker embedding associated with the player of the video game, wherein the target speaker embedding is a learned representation of the voice of the player, and (ii) the source acoustic features;
   generating, as output of the acoustic feature encoder, one or more acoustic feature encodings, wherein generating the one or more acoustic feature encodings comprises generating an acoustic feature encoding for each input time step of a plurality of input time steps of the source acoustic features, wherein the acoustic feature encoding for each input time step comprises a combination of the target speaker embedding for the player and an encoding of the source acoustic features for the input time step;
   inputting, into an acoustic feature decoder of the voice convertor, the one or more acoustic feature encodings;
   generating target acoustic features, comprising decoding the one or more acoustic feature encodings using the acoustic feature decoder, wherein the target acoustic features comprise acoustic features for the speech content in the voice of the player, wherein decoding the one or more acoustic feature encodings comprises, for each output time step of a plurality of output time steps:
      receiving the acoustic feature encoding for each input time step,
      generating, by an attention mechanism, an attention weight for each acoustic feature encoding,
      generating, by the attention mechanism, a context vector for the output time step by averaging each acoustic feature encoding using the respective attention weight, and
      processing, by the acoustic feature decoder, the context vector of the output time step to generate target acoustic features for the output time step; and
   processing the target acoustic features with one or more modules, the one or more modules comprising a vocoder configured to generate speech audio in the voice of the player.

2. The method of claim 1, wherein the speech content is determined from an input of the player of the video game.

3. The method of claim 1, wherein the speech content is determined from content in the video game.

4. The method of claim 1, wherein the input data further comprises at least one of source speaker attribute information or speech style features.

5. The method of claim 1, wherein the input data comprises text data.

6. The method of claim 1, wherein the speech content comprises paralinguistics.

7. The method of claim 1, wherein the target speaker embedding is generated from output of a speaker encoder of the voice convertor, the generating comprising inputting player identifier data into the speaker encoder.

8. A computer-implemented method of generating speech audio data in a video game using a voice convertor that has been trained to convert acoustic features for a source speaker into acoustic features for a player of the video game, the method comprising:
   inputting, into an acoustic feature encoder of the voice convertor, (i) a target speaker embedding associated with a player of the video game, wherein the target speaker embedding is a learned representation of the voice of the player, and (ii) source acoustic features for speech content in the voice of a source speaker;
   generating, as output of the acoustic feature encoder, one or more acoustic feature encodings, wherein generating the one or more acoustic feature encodings comprises generating an acoustic feature encoding for each input time step of a plurality of input time steps of the source acoustic features, wherein the acoustic feature encoding for each input time step comprises a combination of the target speaker embedding for the player and an encoding of the source acoustic features for the input time step;
   inputting, into an acoustic feature decoder of the voice convertor, the one or more acoustic feature encodings; and
   generating target acoustic features for generating speech audio data, comprising decoding the one or more acoustic feature encodings using the acoustic feature decoder, wherein the target acoustic features comprise acoustic features for the speech content in the voice of the player, wherein decoding the one or more acoustic feature encodings comprises, for each output time step of a plurality of output time steps:
      receiving the acoustic feature encoding for each input time step,
      generating, by an attention mechanism, an attention weight for each acoustic feature encoding,
      generating, by the attention mechanism, a context vector for the output time step by averaging each acoustic feature encoding using the respective attention weight, and
      processing, by the acoustic feature decoder, the context vector of the output time step to generate target acoustic features for the output time step.

9. The method of claim 8, wherein the target speaker embedding is generated from output of a speaker encoder of the voice convertor, the generating comprising:
   inputting, into the speaker encoder, one or more examples of speech audio provided by the player;
   generating, as output of the speaker encoder, an embedding for each example of speech audio; and
   generating the target speaker embedding for the player based on the embeddings for each example.

10. The method of claim 9, wherein the target speaker embedding for the player is an average of the embeddings generated for each example.

11. The method of claim 9, wherein the speaker encoder comprises one or more recurrent layers.

12. The method of claim 8, wherein the target speaker embedding is generated from output of a speaker encoder of the voice convertor, the generating comprising:
inputting, into the speaker encoder, a speaker identifier for the player; and
generating, as output of the speaker encoder, the target speaker embedding for the player.

13. The method of claim 12, wherein the speaker encoder comprises one or more fully connected layers.

14. The method of claim 8, wherein each of the one or more acoustic feature encodings comprise a combination of the target speaker embedding and an encoding of the source acoustic features.

15. The method of claim 8, wherein at least one of the acoustic feature encoder or the acoustic feature decoder comprises one or more recurrent layers.

16. A system for generating speech audio in a video game using a voice convertor that has been trained to convert acoustic features for a source speaker into acoustic features for a player of the video game, the system comprising:
a synthesizer being configured to:
receive input data representing speech content; and
output source acoustic features for the speech content in the voice of a source speaker;
a voice convertor comprising an acoustic feature encoder and an acoustic feature decoder, the voice convertor being configured to:
input, into the acoustic feature encoder, (i) a target speaker embedding associated with a player of the video game, wherein the target speaker embedding is a learned representation of the voice of the player, and (ii) the source acoustic features;
generate, as output of the acoustic feature encoder, one or more acoustic feature encodings, wherein generating the one or more acoustic feature encodings comprises generating an acoustic feature encoding for each input time step of a plurality of input time steps of the source acoustic features, wherein the acoustic feature encoding for each input time step comprises a combination of the target speaker embedding for the player and an encoding of the source acoustic features for the input time step;
input, into the acoustic feature decoder, the one or more acoustic feature encodings; and
output target acoustic features for generating speech, comprising decoding the one or more acoustic feature encodings using the acoustic feature decoder, wherein the target acoustic features comprise acoustic features for the speech content in the voice of the player, wherein decoding the one or more acoustic feature encodings comprises, for each output time step of a plurality of output time steps:
receiving the acoustic feature encoding for each input time step,
generating, by an attention mechanism, an attention weight for each acoustic feature encoding,
generating, by the attention mechanism, a context vector for the output time step by averaging each acoustic feature encoding using the respective attention weight, and
processing, by the acoustic feature decoder, the context vector of the output time step to generate target acoustic features for the output time step; and
one or more modules configured to process the target acoustic features, the one or more modules comprising a vocoder configured to generate speech audio in the voice of the player.

17. The system of claim 16, wherein the target speaker embedding is generated from output of a speaker encoder of the voice convertor, the generating comprising inputting player identifier data into the speaker encoder, wherein the player identifier data comprises one of: (i) acoustic features of one or more examples of speech audio provided by the player, or (ii) a speaker identifier for the player.

18. The system of claim 16, wherein the voice convertor is further configured to:
receive one or more examples of speech audio provided by the player; and
update parameters of at least one of the acoustic feature encoder or the acoustic feature decoder, comprising processing the one or more examples of speech audio.

* * * * *

UNITED STATES PATENT AND TRADEMARK OFFICE
CERTIFICATE OF CORRECTION

PATENT NO. : 11,790,884 B1
APPLICATION NO. : 17/082266
DATED : October 17, 2023
INVENTOR(S) : Zahra Shakeri et al.

It is certified that error appears in the above-identified patent and that said Letters Patent is hereby corrected as shown below:

In the Drawings

In Fig. 8, sheet 8 of 10 Tag no. "8.1" delete "Input Input" and insert -- Input --, therefor.

In the Specification

In Column 5, Line 11, delete "100." and insert -- 110. --, therefor.

In Column 6, Line 21, delete "no." and insert -- 110. --, therefor.

In Column 6, Line 30, delete "no." and insert -- 110. --, therefor.

In Column 6, Line 46, delete "no." and insert -- 110. --, therefor.

In Column 18, Line 24, delete "no." and insert -- 110. --, therefor.

Signed and Sealed this
Second Day of January, 2024

Katherine Kelly Vidal
*Director of the United States Patent and Trademark Office*